(12) United States Patent  (10) Patent No.: US 7,350,621 B2
Abraham  (45) Date of Patent: Apr. 1, 2008

(54) LADDER TRANSPORT SYSTEM

(75) Inventor: Richard J. Abraham, Ventura, CA (US)

(73) Assignee: Inovent, Inc., Ojai, CA (US)

( * ) Notice: Subject to any disclaimer, the term of this patent is extended or adjusted under 35 U.S.C. 154(b) by 0 days.

(21) Appl. No.: 11/250,661

(22) Filed: Oct. 14, 2005

(65) Prior Publication Data

US 2006/0038369 A1  Feb. 23, 2006

Related U.S. Application Data

(63) Continuation of application No. 10/352,841, filed on Jan. 27, 2003, and a continuation of application No. PCT/US02/21329, filed on Aug. 15, 2002, and a continuation of application No. 09/792,526, filed on Feb. 23, 2001, now Pat. No. 6,592,134.

(51) Int. Cl.
*E06C 5/00* (2006.01)

(52) U.S. Cl. ............... 182/129; 182/127; 280/79.7; 280/47.3; 16/29

(58) Field of Classification Search ............... 280/79.7, 280/47.3; 182/127, 129; 16/29, 30
See application file for complete search history.

(56) References Cited

U.S. PATENT DOCUMENTS

| 55,567 A | 12/1866 | Wilkins |
| 115,060 A | 5/1871 | Jones |
| 127,571 A | 6/1872 | Clark |
| 274,448 A | 3/1883 | Kinzel |
| 1,004,550 A | 10/1911 | Bertke |
| 3,446,309 A * | 5/1969 | Davis et al. ................ 182/129 |
| 3,463,505 A | 8/1969 | German |
| 3,580,601 A | 5/1971 | Miles |
| 3,841,437 A | 10/1974 | Caughey |
| 4,049,283 A | 9/1977 | Brookes et al. |
| 4,063,616 A | 12/1977 | Gutierrez |
| 4,564,203 A | 1/1986 | Wilson |
| 5,086,872 A | 2/1992 | Lin |
| 5,105,908 A | 4/1992 | Freund |
| 5,153,966 A | 10/1992 | Godwin |
| 5,232,233 A | 8/1993 | Jedora |
| 5,382,032 A | 1/1995 | Wilson |
| 5,511,285 A | 4/1996 | Bush |
| 5,566,780 A * | 10/1996 | Bambrough ................ 182/116 |
| 5,794,307 A | 8/1998 | Overcash et al. |
| 5,833,028 A * | 11/1998 | Ramsey et al. ............. 182/129 |
| 6,328,330 B1 | 12/2001 | Haaser |
| 6,585,084 B2 * | 7/2003 | Gannon ...................... 182/129 |
| 6,592,134 B2 * | 7/2003 | Abraham .................... 280/79.7 |

* cited by examiner

*Primary Examiner*—Kevin Hurley
(74) *Attorney, Agent, or Firm*—Sawyer Law Group LLP

(57) ABSTRACT

Embodiments of ladders (22, 106) are disclosed which utilize a wheel (112) to allow users to transport these ladders easily by rolling along a surface without carrying the entire weight of the ladder. The wheel (112) are located in positions which do not interfere with the use of these ladders.

4 Claims, 28 Drawing Sheets

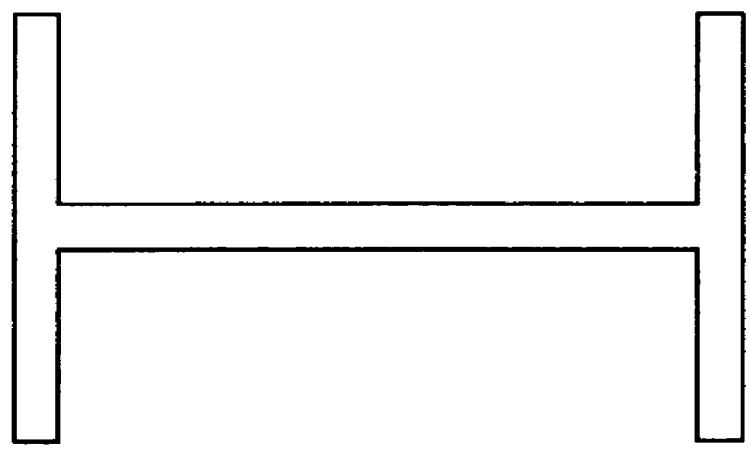
Fig. 13 CHANNEL
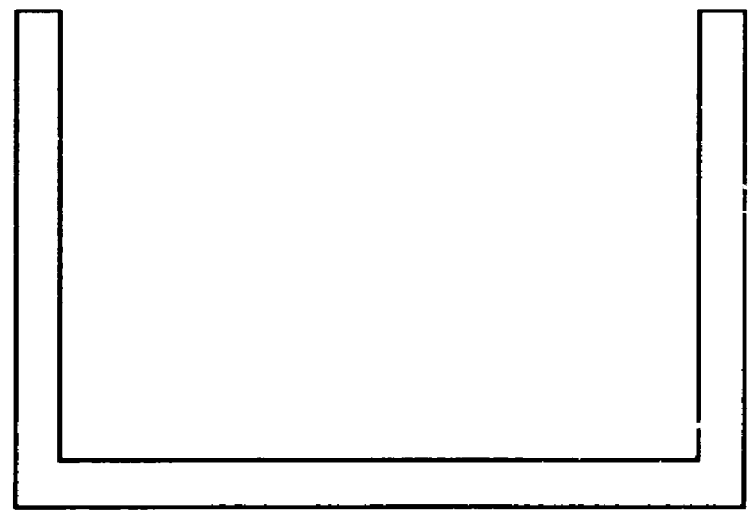
Fig. 12 I-BEAM

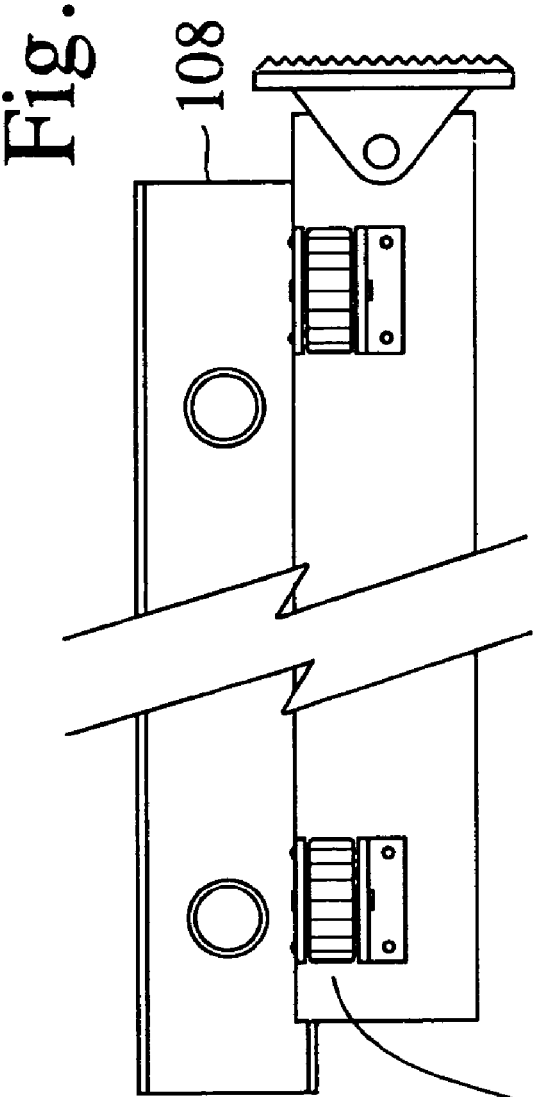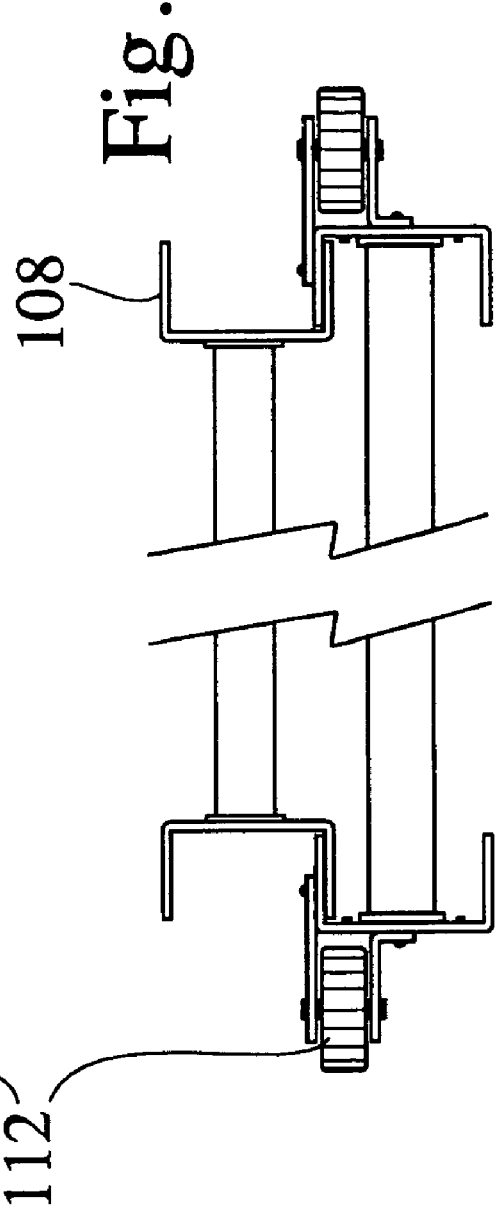

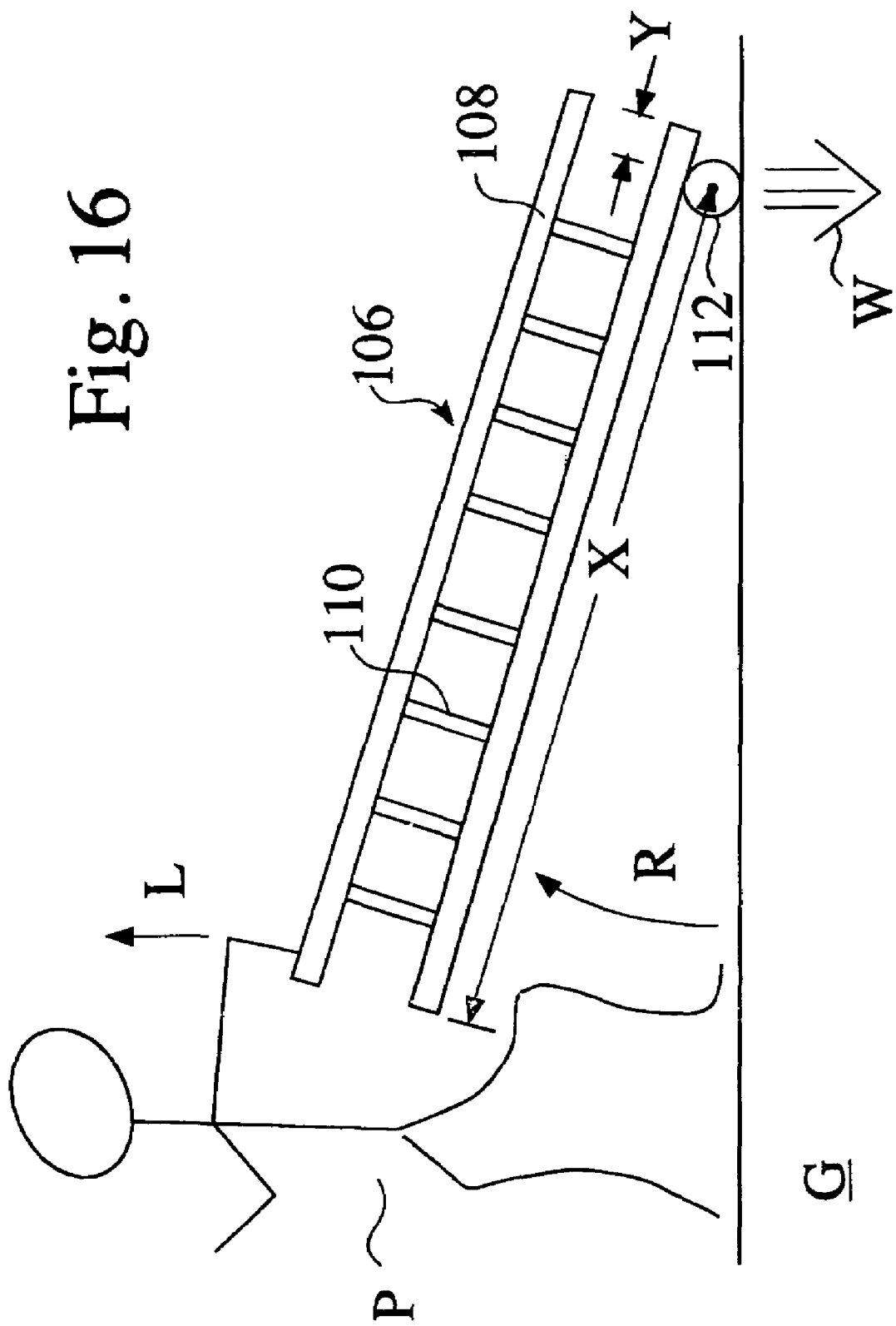

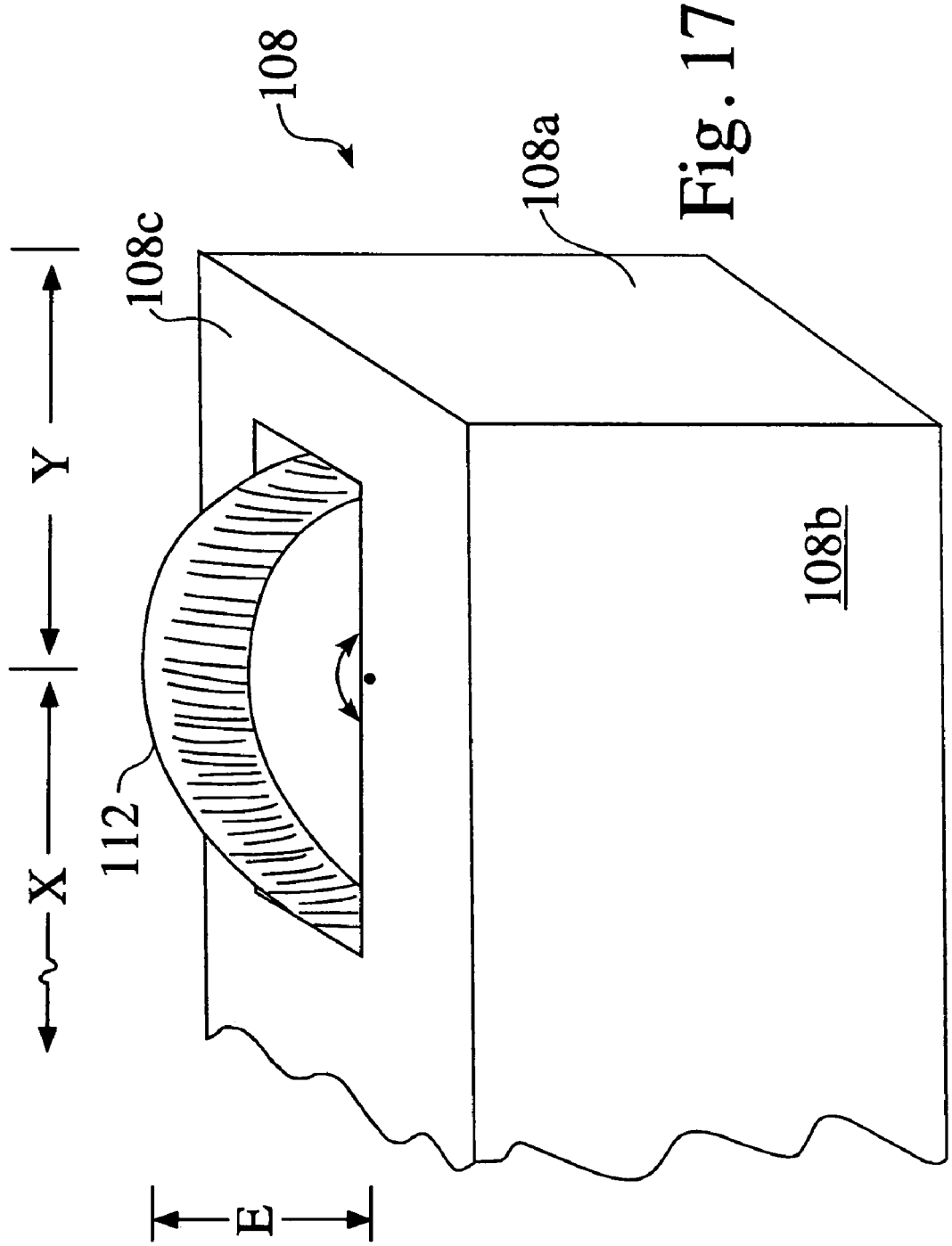

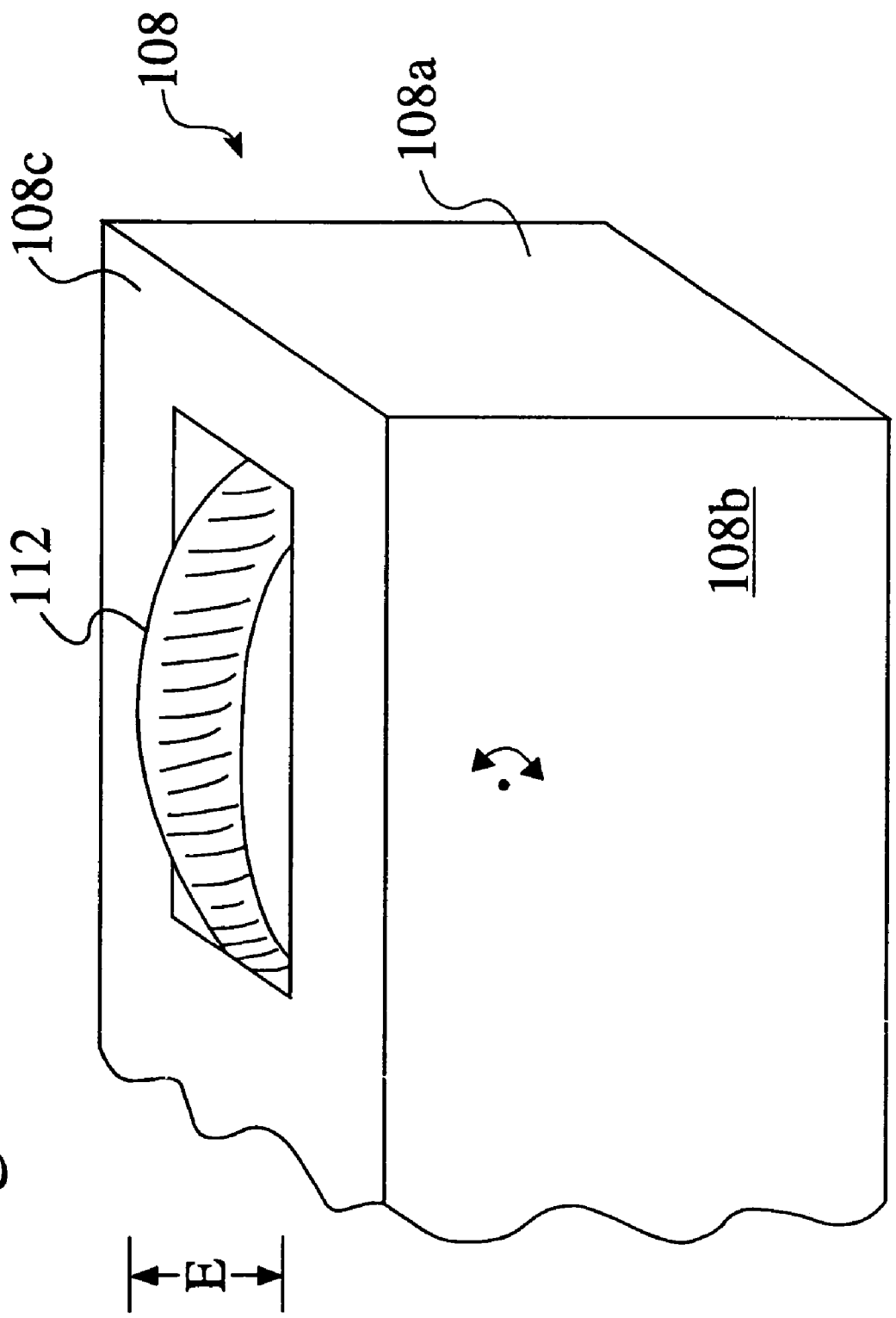

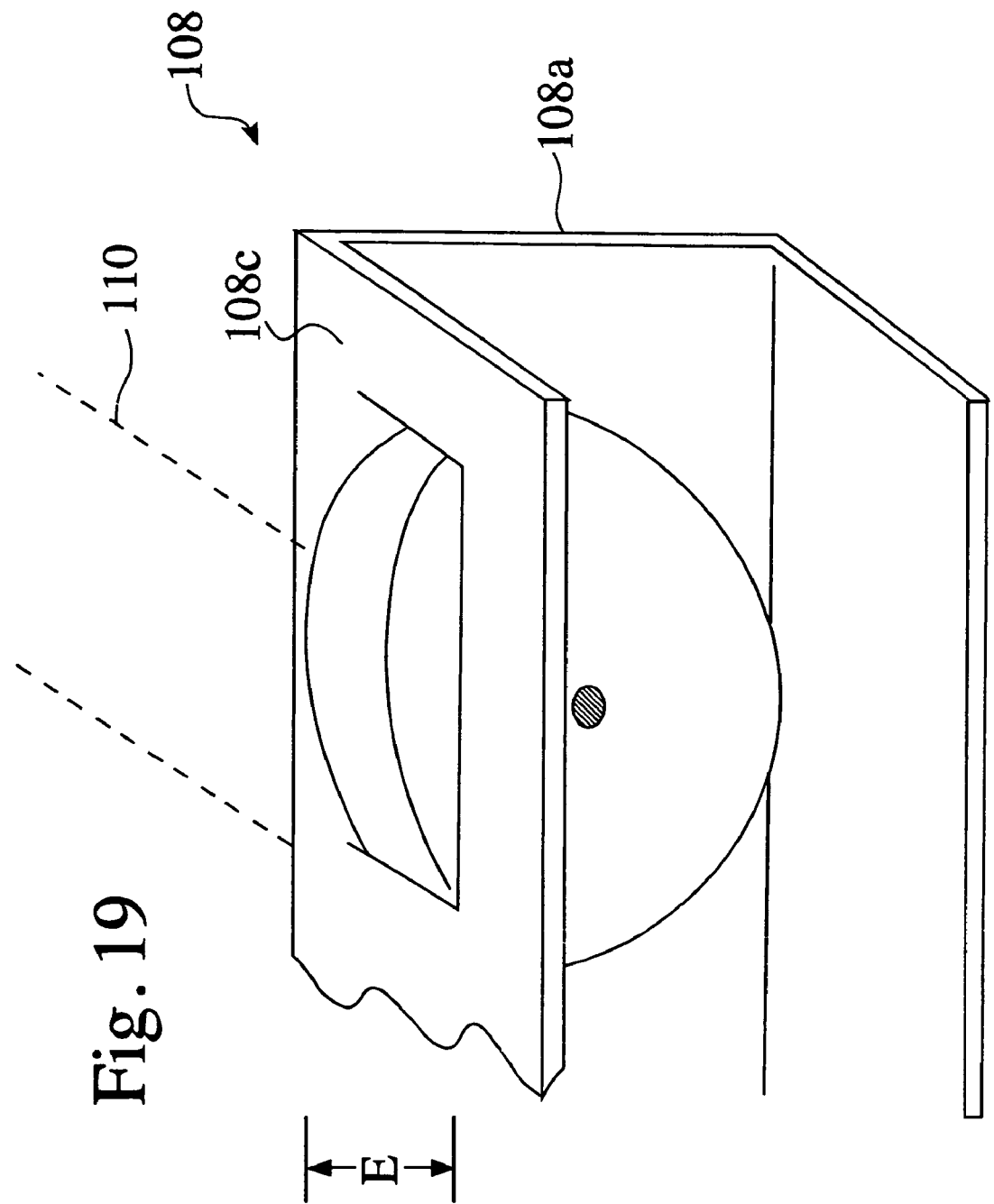

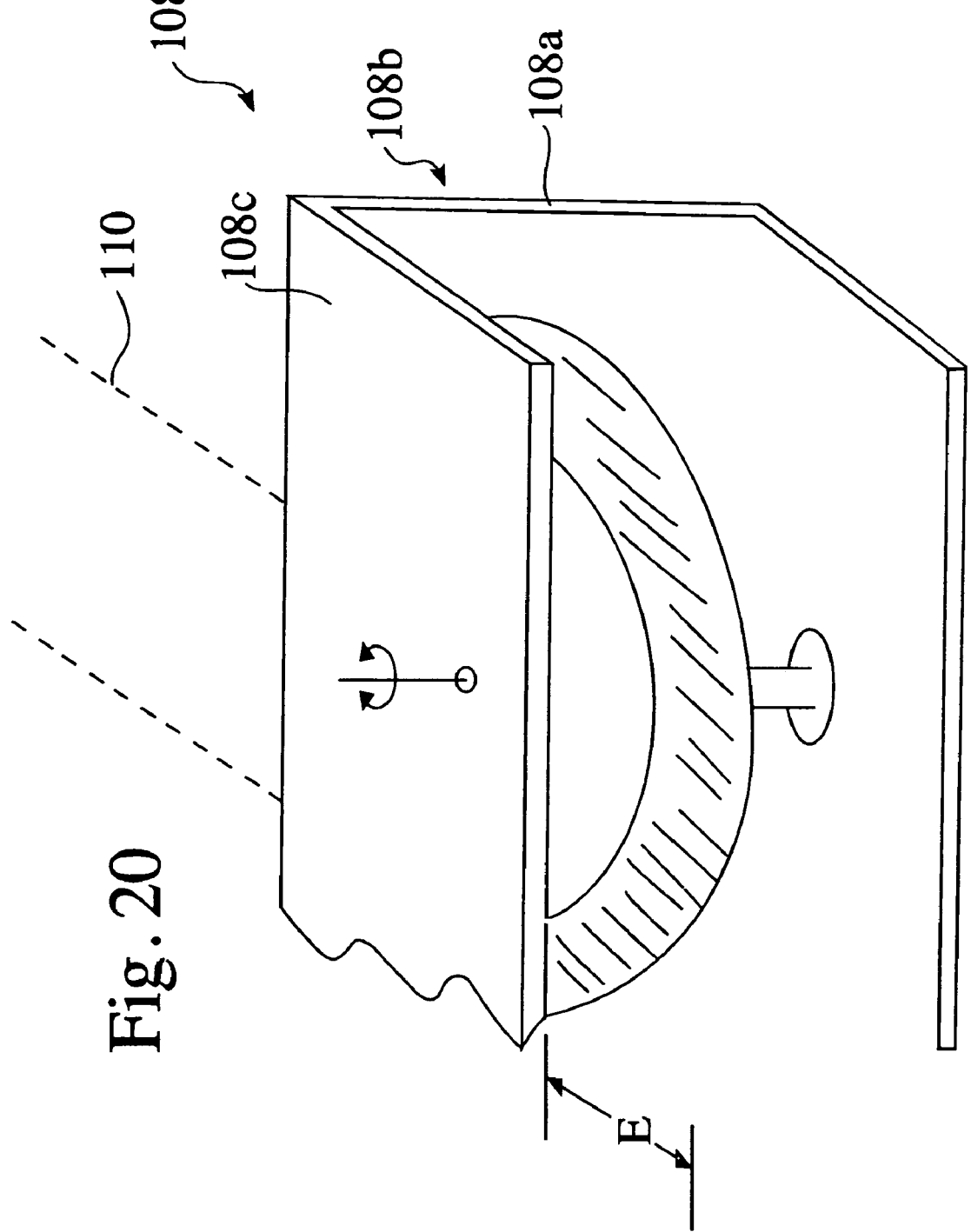

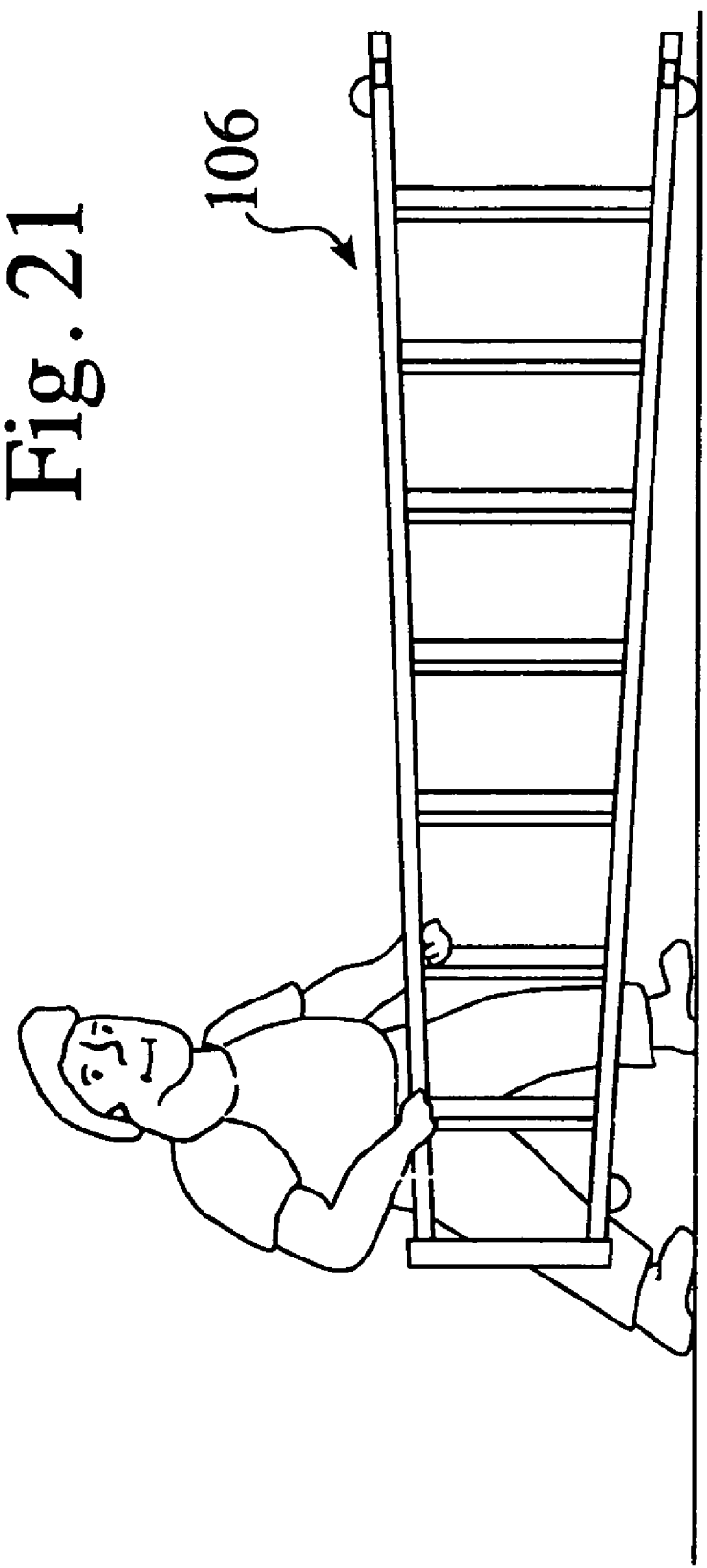

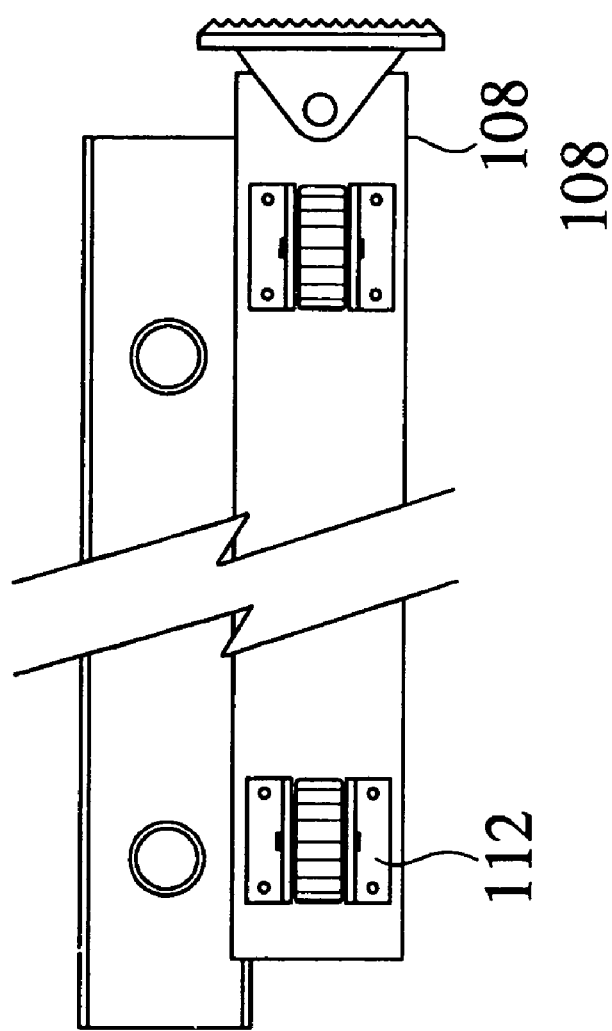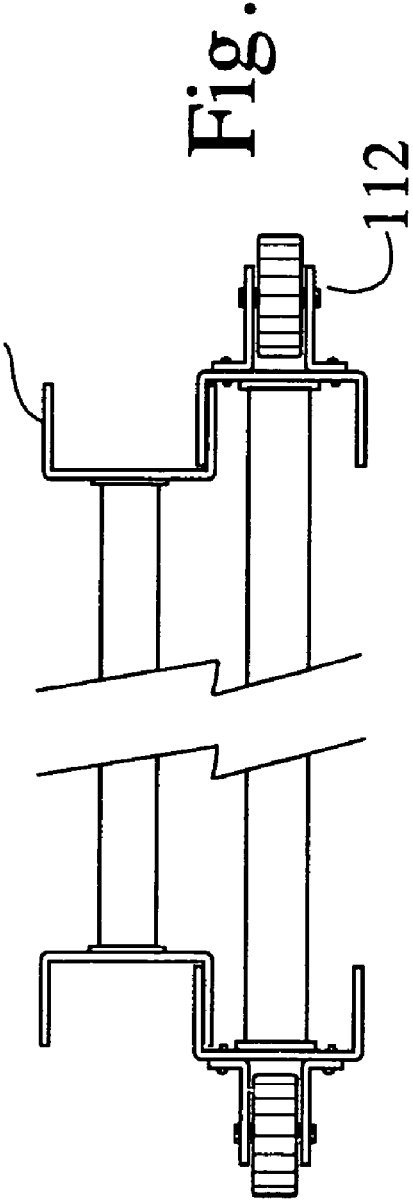

LADDER TRANSPORT SYSTEM

CROSS-REFERENCE TO RELATED PATENT APPLICATIONS

The present Patent Application is a Continuation Patent Application. The Applicant hereby claims the benefit of priority under Sections 119 & 120 of Title 35 of the United States Code of Laws for any subject matter presented in this Application and in:

U.S. patent application Ser. No. 10/352,841, filed on 27 Jan. 2003, entitled Ladder Transport System;

PCT International Patent Application No. 02/21329 filed on 15 Aug. 2002, entitled Ladder Transport System; and U.S. patent application Ser. No. 09/792,526, filed on 23 Feb. 2001 now U.S. Pat. No. 6,592,134, entitled Ladder Transport System.

FIELD OF THE INVENTION

The present invention pertains to methods and apparatus for moving a ladder or a similar climbing tool or appliance. More particularly, the present invention provides a ladder which may be easily transported, but which utilizes a transport mechanism that does not interfere with the use of the ladder.

BACKGROUND OF THE INVENTION

Many kinds of ladders and stepping-stools are known in the art. U.S. Pat. No. 4,564,203 to Ronald Williams, dated Jan. 14, 1986, discloses an aid for transporting a narrow oblong object. In his U.S. Pat. No. 3,580,601, dated May 25, 1971, Ray P. Miller discloses a skate device for transporting unwieldy, flat objects. U.S. Pat. No. 5,566,780, dated Oct. 22, 1996 was issued to Harry M. Hambrough. It describes a combination cart and ladder apparatus including a first and a second ladder assembly.

Peter DiSario's U.S. Pat. No. 5,727,799 presents a dolly for supporting a ladder during movement to a work site. U.S. Pat. No. 5,086,872 to Fan-Nam Lim discloses a foldable ladder equipped with a pair of wheels so the ladder can be converted into a push cart for transportation of various goods. In their U.S. Pat. No. 4,049,283, Brookes et al. describe a caddy for transporting a heavy ladder to a work site.

In his U.S. Pat. No. 5,382,032 dated Jan. 17, 1995 Wilson discloses a wheeled stepladder dolly. U.S. Pat. No. 5,105,908 was issued to Harvey J. Freund on Apr. 21, 1992. It reveals a kit which may be used to convert a ladder tree stand into a towable trailer that may be connected to a motorized vehicle.

U.S. Pat. No. 5,232,233 by John Jedora describes a portable wheel assembly provided with a parallel type clamping system for attachment to objects, such as the transom of a car-top boat.

U.S. Pat. No. 5,882,023 issued to William F. Swager discloses a wheeled transport device for maneuvering elongated objects in a simplified manner. In U.S. Pat. No. 3,841,437 by John W. Caughey, issued Oct. 15, 1974, a stool suitable for standing upon to reach high places is described. U.S. Pat. No. 4,063,616 to Ernest F. Gutierrez, issued Dec. 20, 1977 discloses a safety ladder assembly having a plurality of steps and at least three support feet for supporting the ladder on a horizontal surface. U.S. Pat. No. 5,082,086 was issued to James F. Kerr on Jan. 21, 1992. This patent discloses a ladder including wheels normally received off the ground, and four legs normally supporting the ladder.

In U.S. Pat. No. 127,571, Clark discloses an improvement in casters for sewing machines. Godwin describes a lifting handle attachment for wheelbarrows in his U.S. Pat. No. 5,153,966. Kinzel discloses a ladder attachment in U.S. Pat. No. 274,448. Harry Jones patented an improvement in casters of sewing machines in U.S. Pat. No. 115,060. Another sewing machine caster invention was detailed in Wilkins' U.S. Pat. No. 55,567. Overcash et al. disclosed a wheelbarrow extension handle in their U.S. Pat. No. 5,794,307. Bertke received U.S. Pat. No. 1,004,550 for his step ladder attachment. German et al. were issued U.S. Pat. No. 3,463,505 for their combined container and detachably mounted roller assembly.

The development of a simple ladder transportation system which would reduce or obviate the need for retraction, weight, size and cost, yet still allow one person to easily maneuver and transport a ladder from place-to-place without injury, would constitute a major advance and would satisfy a long felt need in the construction and maintenance industries.

U.S. Pat. No. 6,328,330, entitled "Hand truck attachment for a ladder" was issued to Haaser on 11 Dec. 2001. Haaser discloses a separate, detachable and installable device for use in combination with a ladder to generally convert a ladder to a hand truck which is capable of carrying a workman's cargo to a jobsite.

SUMMARY OF THE INVENTION

The present invention provides methods and apparatus to aid a user in transporting the ladder from place to place. Means for affixing a supporting wheel near the end and the edge of a ladder leg are described. The wheel may be allowed to pivot or "caster" for enhanced maneuverability. In one embodiment, the wheel assembly comprises dual caster wheels, of approximately two-inches diameter or larger. The axes of rotation of the wheels are disposed orthogonally so that at the users option the ladder can be transported on edge or with its face horizontal. The wheel size may be adjusted to the size and type of the ladder to be transported. The Ladder Transport System, called Ladder Buddy™ by the Inventor and the Assignee, can be affixed to nearly any existing ladder, permanently or removably. If desired, two dual-caster wheel assemblies can be used, each one being installed on a principal leg of the ladder. The removable wheel assembly is attached preferably with a single clamp screw, but may be permanently affixed to the ladder, for example, with welds, rivets or bolts.

A permanent or removable wheel of the present invention can be applied to nearly any type of ladder at the point of manufacture. A ladder manufacturer can adapt the invention to his specific type of equipment. The ladder may be one piece, or a multi-segment extension ladder. It may range from a simple step-ladder to a multi-story firemen's ladder. It may be composed of wood, metal or other suitable material.

The caster wheel revolves on an axle which is supported at each end by a wheel bracket. The closed side of the wheel bracket, which parallels the axle, is joined to the back side of a "C" clamp—that is the side of the "C" clamp which is opposite the ladder surfaces against which the clamp frame rests. The wheel bracket may be solidly fixed to the clamp frame or allowed to swivel on a pin about a pivot axis. The clamp frame is placed against the outside surface of a leg of the ladder and the threaded screw of the clamp is tightened down against the flat, inside surface of the ladder's leg. The clamp frame is oriented so that when assembled to one end of a ladder's leg and the ladder is placed with the side of that leg facing a supporting surface, usually the ground or floor, a wheel lies tangent to the supporting surface. The wheel will roll on that supporting surface when a person picks up the free end of the ladder and carries it along.

In a dual-caster wheel assembly, a second caster wheel, approximately identical to the first caster wheel, is disposed on the clamp frame orthogonal to the first caster wheel. The second caster wheel revolves on an axle which is supported at each end by a second wheel bracket. The closed side of the second bracket which parallels the second axle is joined to the side of the clamp frame.

If two dual-caster wheel assemblies are attached to a ladder, one on each principal leg, the ladder may be rotated with its face parallel to the ground or floor, so the ladder end rests on two wheels. This configuration will stably support very large ladders. The ladder can then be propelled by a person carrying the free end in the manner of a wheelbarrow.

When the wheel assembly or assemblies are so attached at one end of the ladder, and the opposite end is supported by a person, the wheel assembly or assemblies can be made to carry a large portion of the weight of the ladder. This relieves the person who must carry a ladder from place-to-place of considerable stress to his or her arms, shoulders, back, wrists, ankles, knees, etc. The portion of weight supported by the person is, of course, the ratio of distance from the center of the wheel to the center of gravity of the ladder to distance from the center of the wheel to where the person grasps the ladder. Thus, repeated use is much less stressful than carrying the entire weight of the ladder. For persons who use ladders frequently in their occupations such as firemen, electricians, carpenters, handymen and tradesmen, the Ladder Buddy™ can help prevent personal injuries caused by the repeated use and transport of ladders. In addition, with the wheel assembly or assemblies so affixed, even very large ladders are easily maneuvered over most types of terrain.

A carrying handle, in one preferred embodiment fabricated of Velcro™ material, may be attached to the ladder leg's at the free end of the ladder. The handle allows the user to carry and pull the ladder while leaving one hand free to open doors or perform other operations.

An alternate embodiment of the Ladder Buddy™ features two single-caster wheel assemblies, each one being installed on a principal leg of a ladder with the rotational axes of the wheels lying in a plane parallel to the face or width of the ladder.

The invention is a useful tool in virtually any industry, office or home where ladders are used, but especially in the construction and maintenance industries. Because of the placement of the wheel assembly, it is possible for one person to maneuver a ladder through and around narrow passageways such as doorways and around corners. The ladder with attached wheels can be erected and operated without inhibiting or interfering with the normal opening, closing, extending or retracting functions.

The present invention is also useful for elderly persons, particularly homeowners who have only occasional need to use a ladder. The Ladder Buddy™ will undoubtedly become an indispensable part of manufactured ladders and will be sold to present ladder owners.

In another alternative embodiment of the invention, the wheel assembly is mounted inside one or more of the rungs of the ladder in a position which does not interfere with the operation of the ladder.

An appreciation of the other aims and objectives of the present invention and a more complete and comprehensive understanding of this invention may be obtained by studying the following description of a preferred embodiment, and by referring to the accompanying drawings.

BRIEF DESCRIPTION OF THE DRAWINGS

FIGS. 12 & 13 portray generalized cross-sections of an I-beam and a channel.

FIGS. 14 & 15 reveal side and cross-sectional views of portions of ladders having an internal wheel assembly.

FIG. 16 is a generalized pictorial view a person moving a ladder, which shows that most of the weight of the ladder is borne by the wheel.

FIGS. 17, 18, 19 & 20 of wheels mounted on ladder rails.

FIG. 21 depicts a man moving a ladder with an internal wheel assembly by lifting one end and pushing the ladder while it rolls on its internal wheel.

FIGS. 28 & 29 provide detailed views of additional alternative embodiments of the invention.

DETAILED DESCRIPTION

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

I. An Embodiment Using an External Wheel

Figure 1:
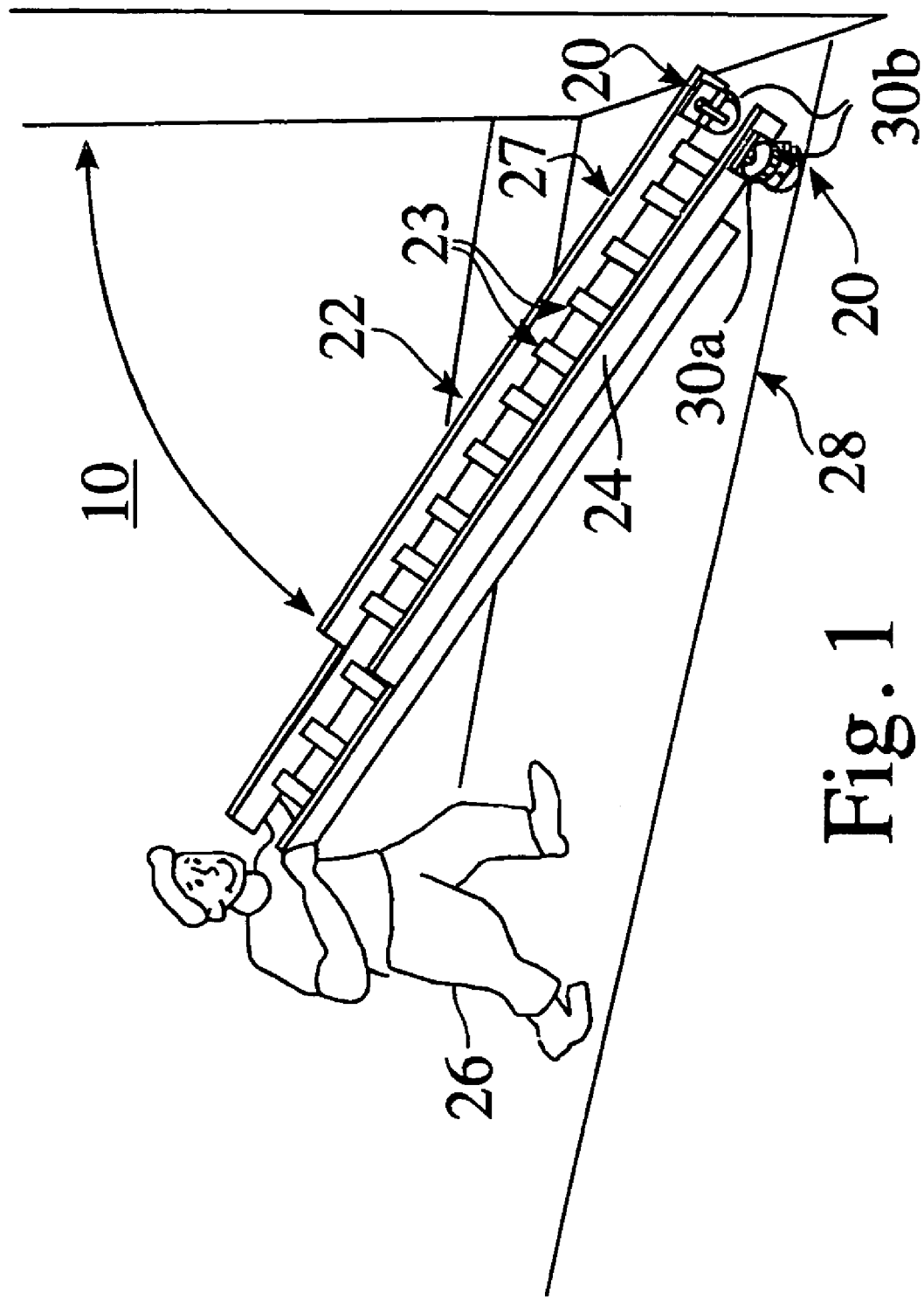
FIG. 1 is an illustration which shows a user transporting a conventional extension ladder from one job site to another with the aid of the Ladder Transport System (Ladder Buddy™) which is affixed at an end of the ladder and does not interfere with erection and use of the ladder.

One embodiment of the present invention comprises methods and apparatus for affixing a wheel assembly near the end and the outside of a ladder leg, by any suitable means in order to aid a user in transporting the ladder. FIG. 1 illustrates one preferred embodiment of the Ladder Transport System, 10, called Ladder 5 Buddy™ by the Inventor and Assignee. A dual-caster wheel assembly 20 is affixed to each leg 24 of a conventional ladder 22, permanently or removably. Each dualcaster wheel assembly 20 is affixed near the end of the ladder 22. The ladder face in this embodiment is oriented parallel to the support surface 28, usually the ground or floor. The wheels are allowed to rest on the support surface 28. A user 26 grasps the ladder 22 at its free end, opposite the end where the dual-caster wheel assemblies 20 are affixed, and by lifting the ladder 22 and pushing or pulling it along, wheelbarrow style, can easily guide the ladder 22 as he or she moves it from place-to-place. The ladder 22 may be one piece, or a multi-segment extension ladder. It may range from a simple step-ladder to a multi-story firemen's ladder.

A second caster wheel 30b, approximately identical to the first caster wheel 30a, is disposed orthogonal to the first caster wheel 30a. The wheel assembly 20 is oriented so that when it is assembled at one end of a ladder's leg 24 and a face of the ladder 22 is placed facing a supporting surface 28, usually the ground or the floor, the second caster wheel 30b lies tangent to the supporting surface 28. As depicted in FIG. 1, the second caster wheel 30b will roll on the supporting surface 28 when a person 26 picks up the opposite end of the ladder 22 and carries it along.

When the wheel assembly 20 is so attached, and the ladder 22 is supported at the opposite end by a person 26, the wheel assembly 20 can be made to carry a large portion of the weight of the ladder 22. The portion of weight supported by the person 26 is, of course, the ratio of distance from the center of the wheel 30b to the center of gravity of the ladder 22 to the distance from the center of the wheel 30 to the place where the person 26 grasps the ladder 22.

Figure 2:
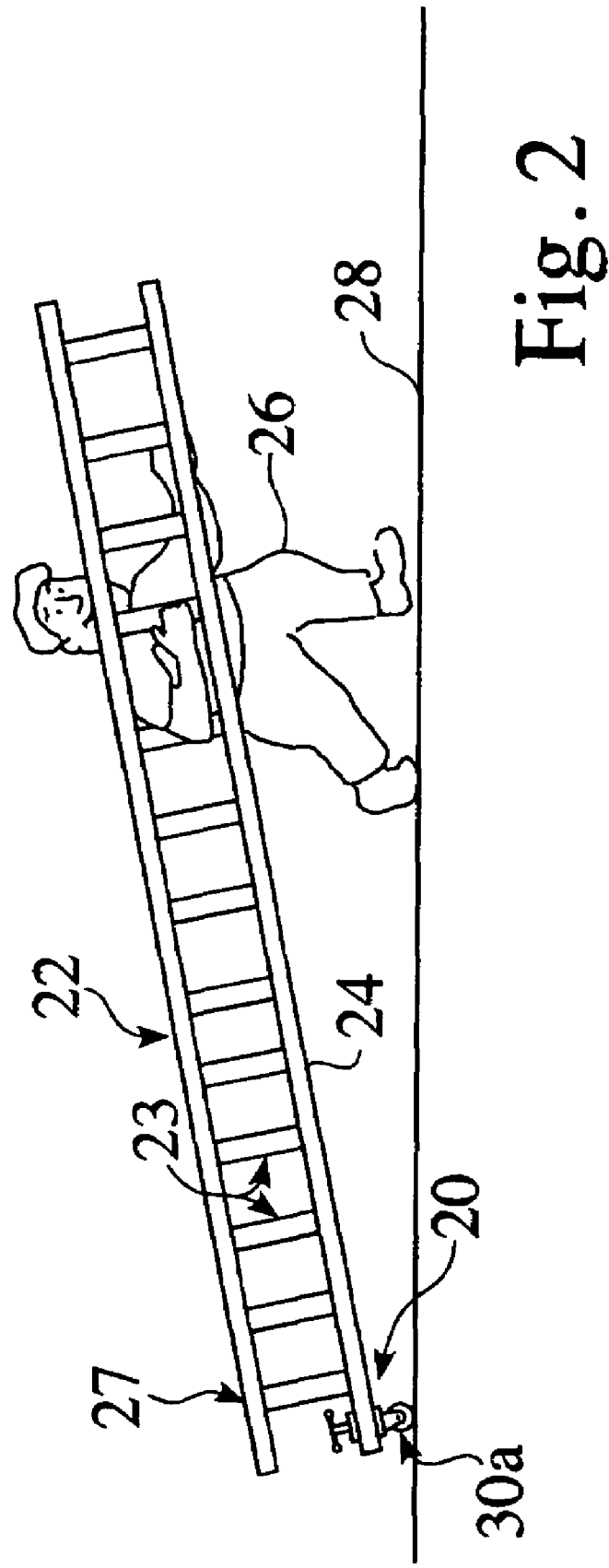
FIG. 2 is an illustration of a Ladder Buddy™ system illustrating its simple, non-interfering attachment to a leg of a conventional, long ladder.

FIG. 2 shows an alternative embodiment of the Ladder Transport System 10b. A caster wheel assembly 20 is affixed to one leg 24 of a conventional ladder 22, permanently or removably. The wheel assembly 20 is affixed near the end of the ladder 22. The ladder face in this case is oriented perpendicular, and a side of the ladder leg 24, 27 is oriented parallel, to the support surface 28, ground or floor. The first caster wheel 30a is allowed to rest on the support surface 28. A user 26 grasps the ladder 22 at its free end, opposite the end where the caster wheel assembly 20 is affixed and by lifting the ladder 22, and pushing or pulling it along, can easily guide the ladder 22.

Figure 3:
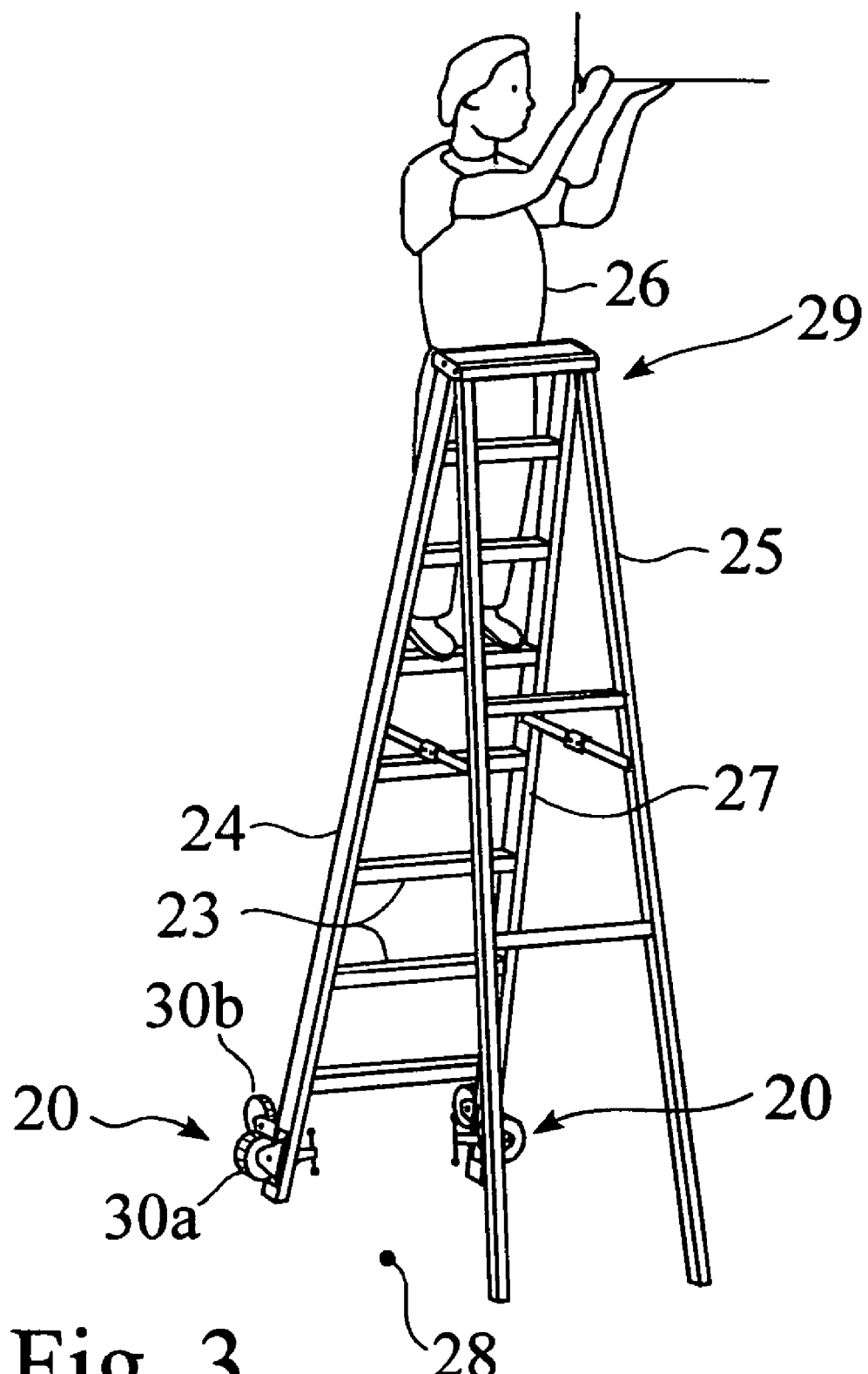
FIG. 3 is a perspective view of a Ladder Buddy™ system showing its simple non-interfering attachment to the a legs of a large step ladder.

FIG. 3 depicts dual-caster wheel assemblies 20 clamped to the principal legs 20 24, 27 of a step ladder 29. It is easily seen that by folding the auxiliary legs 25 against the principal legs 24 and leaning the stepladder 29 back toward the user 26, the second caster wheel 30b will contact the support surface 28, ground or floor and thus permit the stepladder 29 to be trasported easily with the ladder face parallel to the ground or floor 28. Alternatively, the user can fold the stepladder 29, orient it on edge and transport it in that manner on one first caster wheel 30a.

Figure 4:
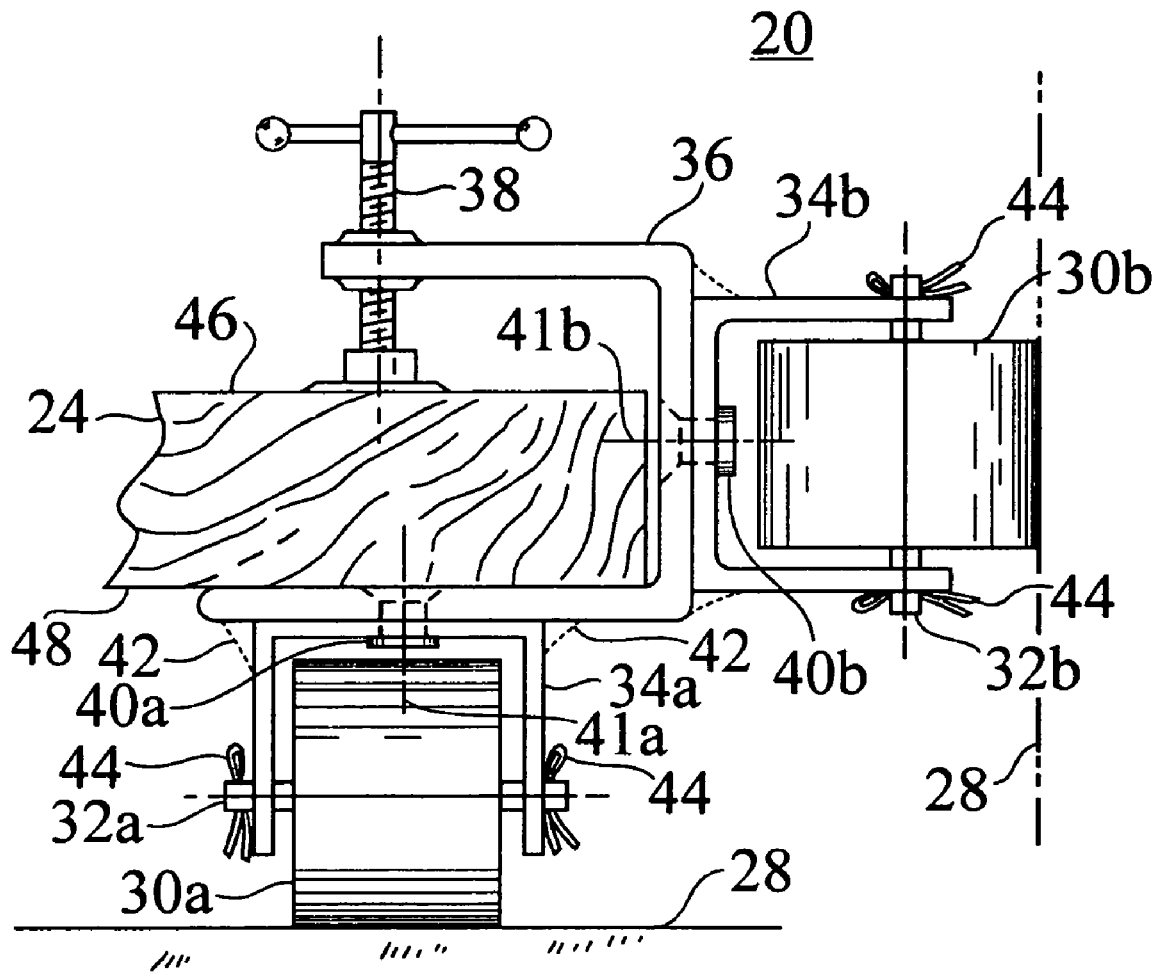
FIG. 4 is an elevation view of a removably affixed, dual-caster assembly, seen from the ladder end. The system is used by a person to easily transport a ladder, showing it's non-interfering attachment to a ladder leg according to the present invention.

FIG. 4 depicts a preferred embodiment of a dual-caster wheel assembly 20. A first caster wheel 30a is disposed in a clamp frame 36. The first caster wheel 30a is approximately two-inches diameter or larger. The size of the wheel 30a may be adjusted to carry the weight of the size and type of the ladder 22 to be transported. The first caster wheel 30a revolves on an axle 32a which is supported at each end by a wheel bracket 34a. The closed side of the wheel bracket 34a which parallels the axle 32a is joined to the back side of a C-shaped clamp frame 36—that is the side which is opposite a threaded clamp screw 38. The wheel bracket 34a may be solidly fixed to the clamp frame 36 by welding 42, riveting, bolting or similar joining process. Or, preferably, it may be allowed to swivel on a pivot pin 40a about a pivot axis 41a. The clamp frame 36 is placed against a side 48 of a ladder's leg 24 and the threaded screw 38 is tightened against a flat, inside surface 46 of the ladder's leg 24.

The ladder leg 24 illustrated is of one type of ladder 22 made, for example, from wood. The reader will appreciate that ladders 22 made also be made from metal or other materials and have various cross-sections.

A second caster wheel 30b is disposed on the clamp frame 36, orthogonally to the first caster wheel 30a. It revolves on an axle 32b which is supported at each end by a wheel bracket 34b. The closed side of the wheel bracket 34b which parallels the axle 32b is joined to the side of the C-shaped clamp frame 36. The wheel bracket 34b also may be solidly fixed to the clamp frame 36 by welding, riveting, bolting or similar joining process. Or, preferably, it may be allowed to swivel on a pivot pin 40b about a pivot axis 41b. This embodiment of the invention as illustrated can be easily assembled to nearly all types of ladders 22 and easily adapted to others if necessary.

Figure 5:
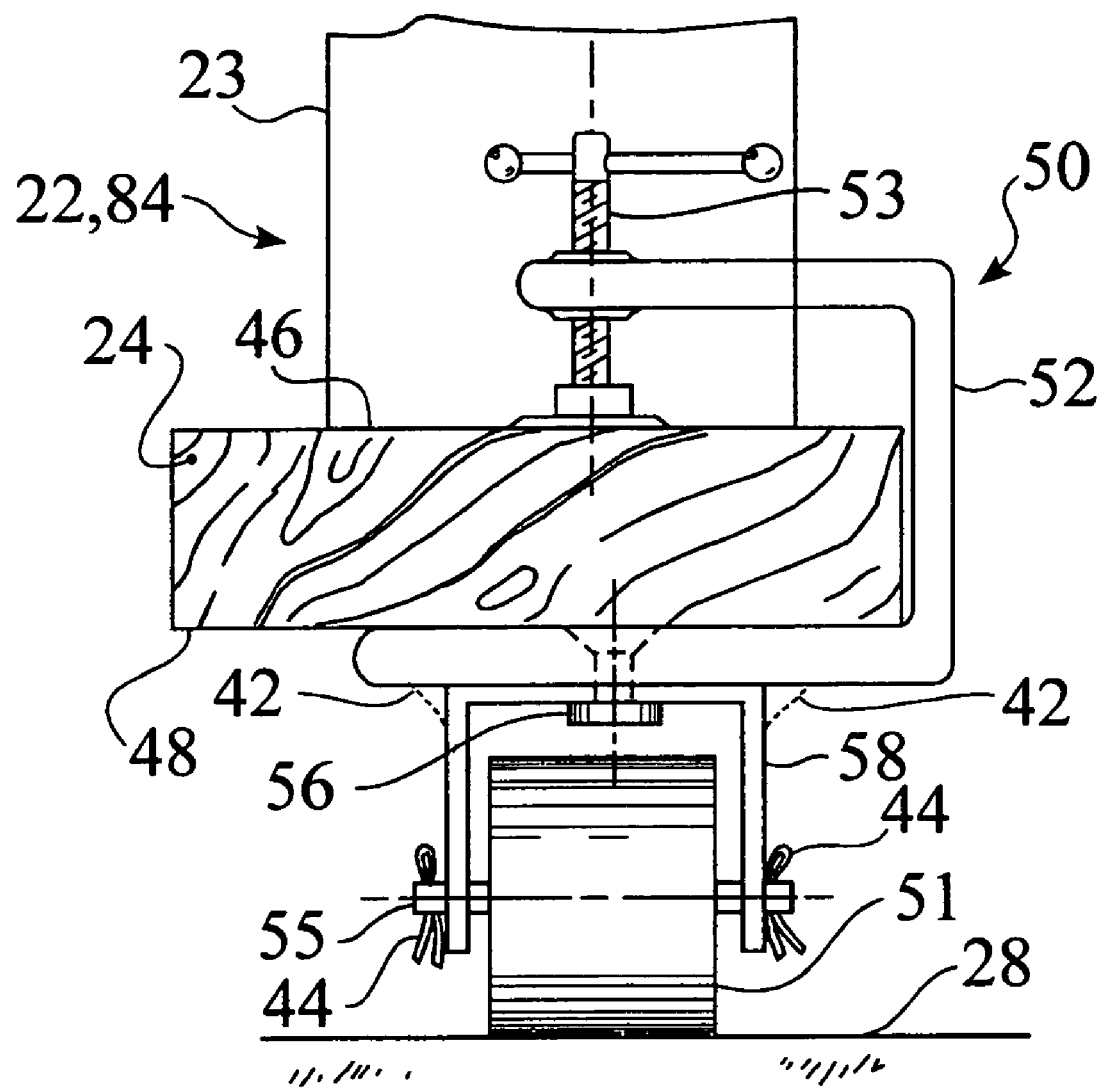
FIG. 5 reveals an elevation view, seen from the ladder end, of a single-caster assembly, used in an alternate embodiment of the present invention by a person to easily transport a large ladder, showing its non-interfering attachment to a ladder leg.

FIG. 5 shows in elevation view, seen from the ladder end, of a single-caster assembly 50, used in an alternate embodiment of the present invention. The wheel assembly 50 is oriented to easily transport a large ladder on its edge as was also depicted in FIG. 2. While less versatile than the dual-caster wheel assembly 20 this configuration of single caster-wheel assembly 50 is less expense than the dual-caster wheel device 20. The clamp frame 52 is only provided with one wheel bracket 34 on which a caster wheel 30 revolves on axle 32. A pivot pin 40 connects the bracket 34 to the clamp frame 52 between the two sides of the ladder legs 24, 27. As before, weldment 42 or other fasteners my be used to connect the bracket 34 to the clamp frame 36.

Figure 6:
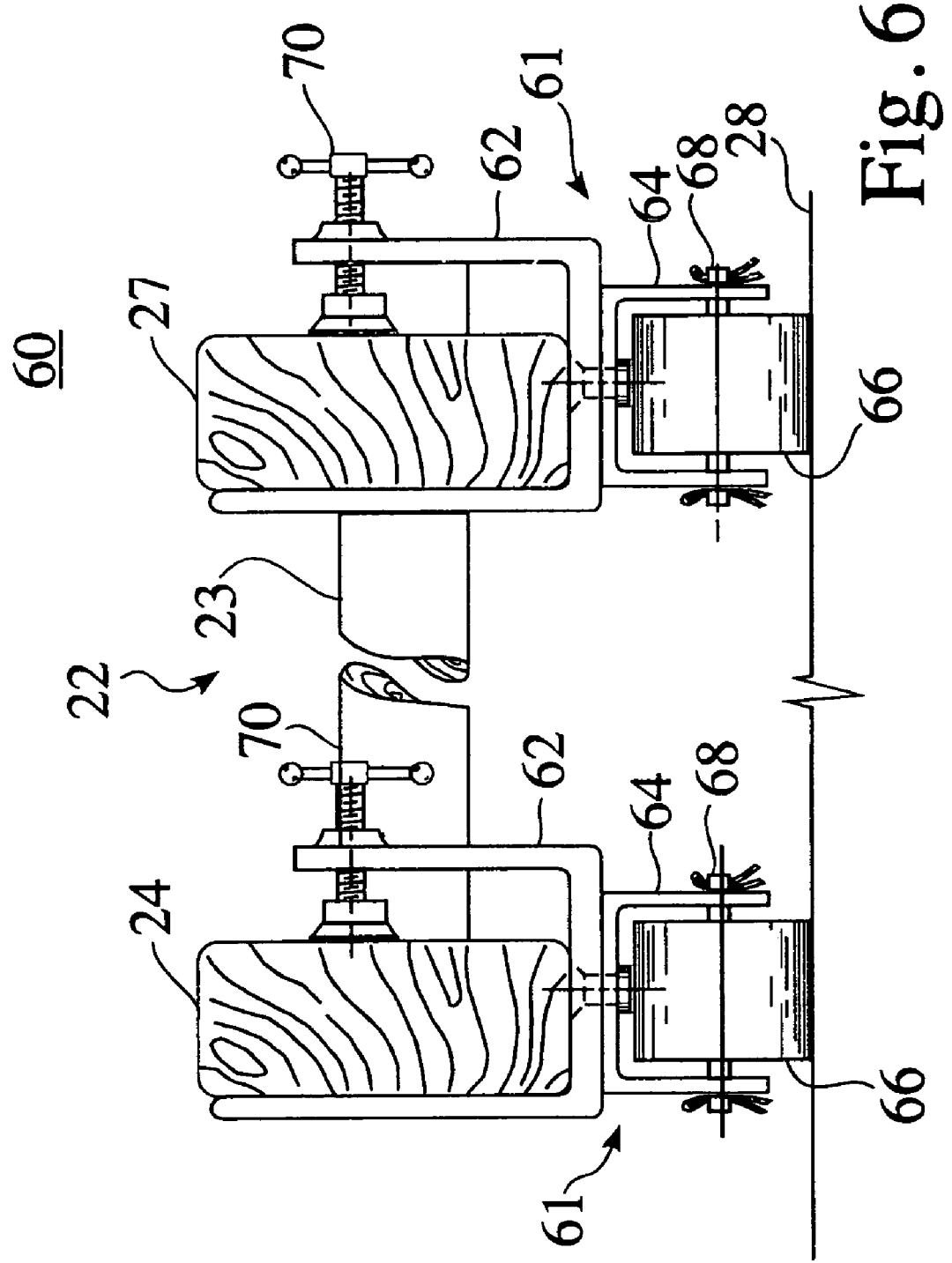
FIG. 6 is an elevation view, seen from the ladder end, of two single-caster wheel assemblies used in an alternative embodiment of the present invention by a person to easily transport a large ladder or step ladder, showing it's non-interfering attachment to the ladder legs.

FIG. 6 presents an alternative embodiment of the invention suitable for adding stability when a person 26 must transport a very large ladder 84. In this embodiment, a first single-caster wheel assembly 61 is affixed along the edge of one ladder leg 24, a second single-caster wheel assembly 61 is affixed along the edge of a second leg 27, and each wheel assembly 61 is aligned with the other along the ladder's length.

Figure 7:
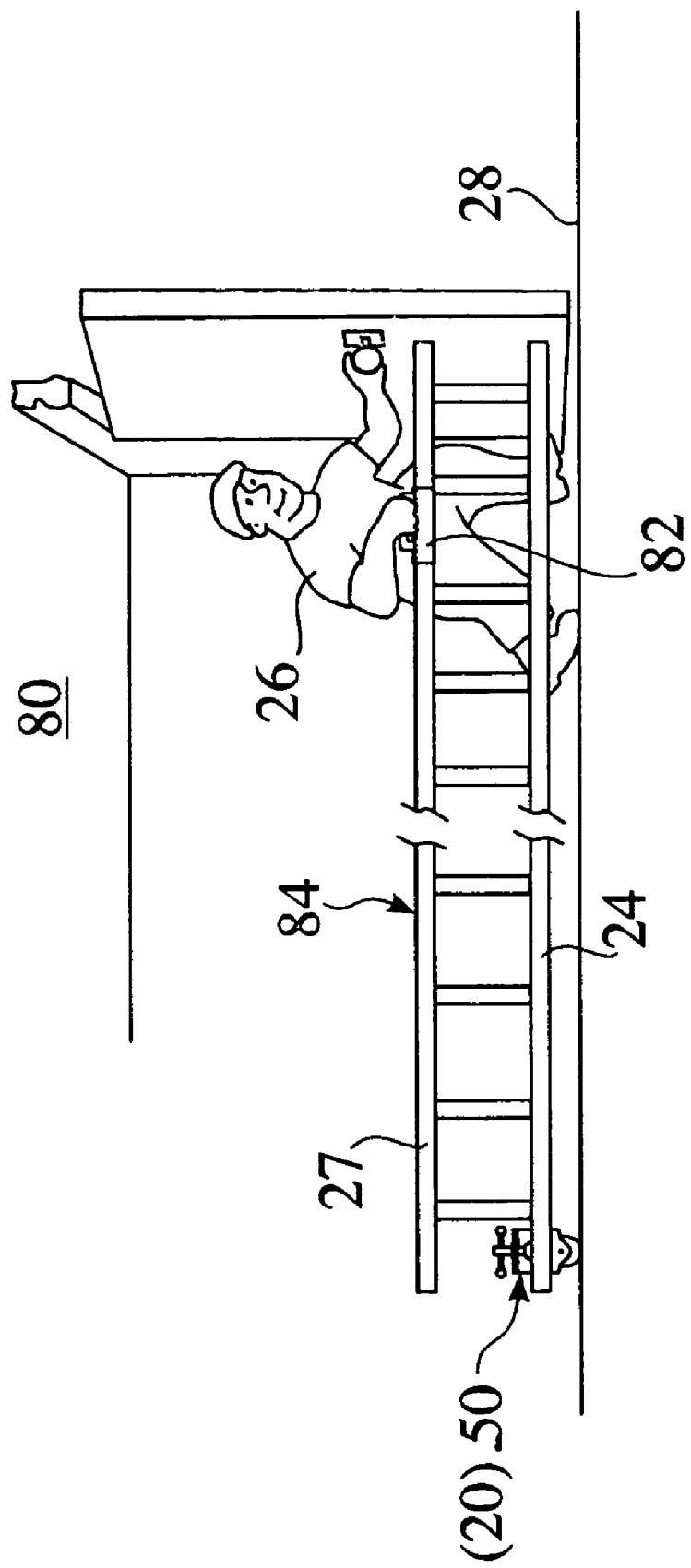
FIG. 7 is a an illustration which depicts a user transporting a conventional large ladder with the aid of one single or dual-caster Ladder Buddy™ and a carrying handle which allows one hand free for other operations.

FIG. 7 depicts a user transporting a conventional ladder 84 with the aid of the wheel assembly 20 and a carrying handle 82 which allows one hand free for other operations such as opening a door. The carrying handle 82 is affixed to the ladder 84 on a leg 27 opposite to ladder leg 24, and to an end of said ladder assembly 84 opposite the extreme end to which the wheel assembly 20 is affixed. The carrying handle 82 in a preferred embodiment is made of Velcro® hook-and-loop fabric which is wrapped around the ladder leg 27 and secured with hand pressure. The reader will appreciate that other materials and methods of attachment may be used for the carrying handle 82.

Figure 8:
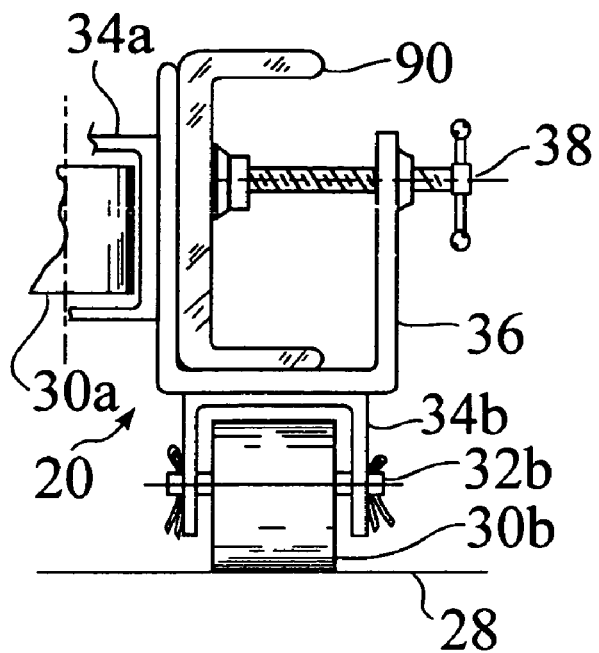
FIG. 8 presents an elevation view, seen from the ladder end, of a dual-caster wheel assembly clamped to a channel-shaped, metal ladder leg, the ladder leg resting on edge in the clamp frame, showing the ability of the Ladder Buddy™ to attach to various types of ladder construction and material.

FIG. 8 presents an elevation view, seen from the ladder end, of a dual-caster wheel assembly 20 clamped to a channel-shaped, metal ladder leg 90. The ladder leg 90 rests on edge in the clamp frame 36. The ability of the Ladder Buddy™ to attach to various types of ladder construction and material is illustrated.

Figure 9:
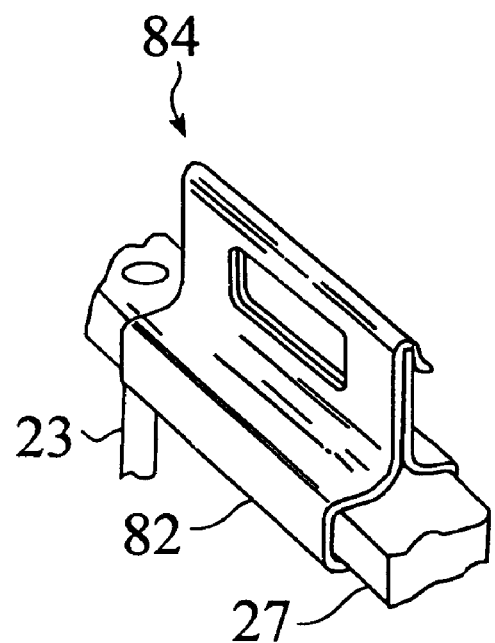
FIG. 9 is a perspective view of a carrying handle made from Velcro™ material wrapped around the ladder leg, which allows the user to transport the ladder with one hand free.

FIG. 9 is a perspective view of a carrying handle 82 made from Velcro sheet which is wrapped around the ladder leg 27 and pressed together on contact. The handle 82 allows the user to transport the ladder assembly 84 with one hand free.

Figure 10:
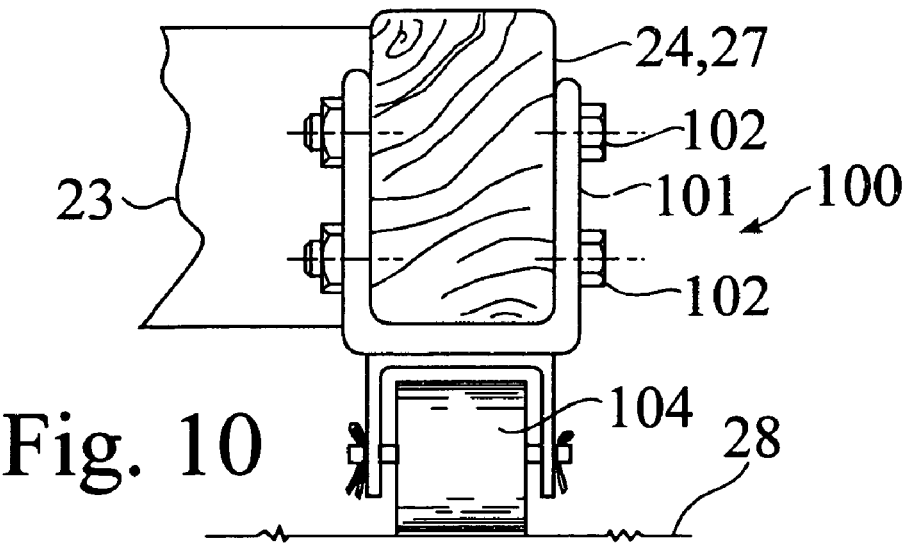
FIG. 10 presents an elevation view, seen from the ladder end, of a singlecaster wheel assembly non-removably connected to a ladder leg, as most likely used on a newly manufactured ladder.

In FIG. 10, a wheel assembly 100, non-removably connected to a ladder leg 102, is seen from the ladder end. In this illustration, the ladder face is oriented parallel to the support surface 28.

II. An Embodiment Utilizing an Internal Wheel

Figure 11:
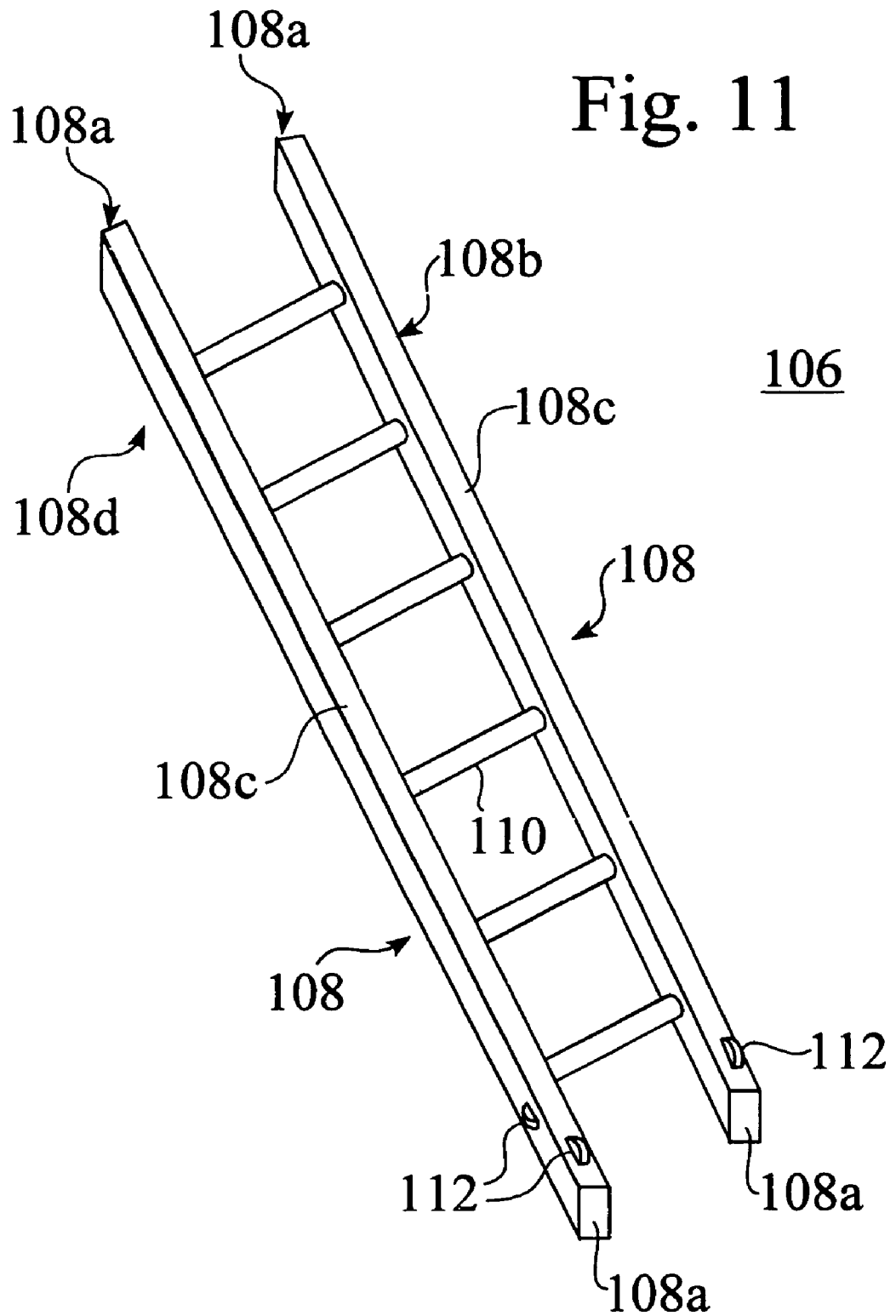
FIG. 11 is a perspective view of an alternative embodiment of the invention, which comprises a ladder with an internal wheel assembly.

FIG. 11 supplies a perspective view of an alternative embodiment of the invention, which comprises a ladder 106 with an internal wheel assembly 112. In general, a straight ladder 106 comprises a pair of parallel rails 108 joined by orthogonal rungs 110. The rails 108 are usually fully-rectangular or partially-rectangular in cross-section, and generally have four sets of planar surfaces: end surfaces 108a, side surfaces 108b, front surfaces 108c, and rear surfaces 108d.

Unlike wooden ladders, which have solid rails that are usually fully-rectangular in cross-section, some ladders that utilize fiberglass or aluminum rails which may incorporate bent or molded sections or lengths forming hollows or cavities. Most plastic or metal ladders employ partially-rectangular cross-sections in the form of "Ibeam" or "channel" structures comprising intersected and generally orthogonal planes or surfaces of material, as shown in FIGS. 12 & 13. Although molded or metal ladders may not have a complete set of contiguous surfaces that form fully-rectangular solid rails like a wooden ladder, they usually have some front, side and rear surfaces.

FIGS. 14 & 15 reveal side and cross-sectional views of portions of ladders 106 having an internal wheel assembly 112. In the Specification and in the Claims that follow, the terms "internal wheel," "internal wheel assembly," and "internal caster" refer to any rotating, revolving, orbiting, rolling, spinning or circular translation element or means which facilitates a convenient transportation feature for a ladder. In one embodiment, the invention comprises the combination of a ladder and any "internal wheel means" for enabling a user to move a ladder easily without carrying the ladder and bearing its full weight. As shown in FIG. 16, a person P grasping a ladder 106 at one end supplies a lifting force L which causes the ladder 106 to rotate upward through arc R as it pivots on the wheel 112 located at the opposite end. This embodiment of the invention allows the user to move the ladder 106 while the plane containing the rails 108 and the rungs 110 are generally orthogonal to the ground G. Most of the weight W of the ladder 106 is borne by the wheel 112, and allows the user to transport the ladder 106 without bearing the entire weight of the ladder 106. The distance X from the end near the user P to the wheel is much larger than the distance Y from the wheel 112 to the opposite end. When X is much larger than Y, the user can move the ladder without scraping the opposite end near the wheel without scraping the wheeled end of the ladder on the ground G as the ladder 106 is transported. At the same time, the wheel means that allows the ladder to be moved easily by the user does not interfere with the operation of the invention or increasing safety hazards to the user.

In one embodiment of the invention, some portion of the wheel 112 extends inside one of the surfaces of a rail, while another portion of the wheel extends outside of the one of the surfaces of a rail so that it may contact and roll upon a transport surface. These aspect of the invention is shown best in FIGS. 17 through 20. In each of these four figures, the wheel 112 extends beyond the plane of one of the surfaces of a ladder rail 108 by a distance E. This extension of the wheel is greater in the embodiment shown in FIG. 17 than it is in the embodiment shown in FIG. 18. In FIGS. 17 & 18, the wheel extends out from the a front surface 108c of a rail 108. In FIGS. 19 & 20, a ladder 106 which utilize the three-sided channel shown in FIG. 13 is depicted. Both FIGS. 19 & 20 reveal wheels 112 that partially occupy the chamber or cavity formed by and enclosed within the three-sided channel. A portion of the wheel 112 in FIG. 19 extends for a distance E beyond the front surface 108c of rail 108. A portion of the wheel 112 in FIG. 20 extends for a distance E away from the part of the three-sided channel that forms the side of the rail 108b.

In one embodiment of the invention, the rail is either formed with a hollow within the front, side and rear surfaces. In an alternative embodiment, the rail is formed from an arrangement of surfaces such as an I-beam or a three-sided channel. In yet another embodiment, the rail comprises some other combination of surface elements to provide a partially open or exposed chamber or cavity in which the wheel may partially or fully reside.

In the various embodiments of the invention, the wheel may be permanently coupled to the ladder in a fixed connection, may be removable, or may be fully or partially retractable or otherwise adjustable.

In this Specification and in the Claims that follow, the description of the wheel means as "not interfering with the user or creating safety hazards" generally means that the wheel means is mounted or configured in a way which does not present an obstacle or impediment to the user when the ladder is climbed, or while the user works on one of the steps or rungs of the ladder. Specifically, this embodiment of the invention provides a ladder which employs a wheel means that is not located in a place where the user will step, or where the user's body may otherwise impinge upon or otherwise contact the ladder in a way that would de-stabilize the ladder or cause injury to the user or some other object.

FIGS. 21 through 27 illustrate various views of preferred embodiments of the invention. Internal wheel assemblies 112 are permanently mounted within part of one or more of the rails 108 of the ladder 106. In this Specification and in the Claims that follow, the term "internal" is used to describe a wheel assembly or other means to particularly point out a geometrical relationship between a ladder rail 108 and a wheel or caster 112. Specifically, an internal wheel or caster generally resides within or partially within the external planes of a rail, which comprise the two side surfaces 108b, front surface 108c, and rear surface 108d of the rail. An internal wheel is a generally a wheel which is at least partially enclosed by a surface of a rail, even if the rail is not fully-rectangular in cross-section, that is, having four complete intersecting external planes. In some instances, an internal wheel may have a portion of its radius or diameter generally exposed to the space outside the ladder, but is still sheltered in a recess, hollow or cavity formed by the surfaces of the rail. An internal wheel having an arc or segment which extends through an aperture or the plane of a rail surface.

The term "front surface" 108c refers to the surface of a ladder rail which faces a user when a ladder is in use. The term "rear surface" refers to the surface of a ladder rail which faces away from a user when a ladder is in use. Although these surfaces may be identical except for the placement of a wheel, the distinction between front and rear surfaces is important. The front surfaces should not impede a person when he or she climbs or uses the ladder, and so, in general, the wheel is best located at the end of the ladder which contacts the ground.

In the case of a straight ladder which is placed against a wall, the rear surface 108d of the rail is the long surface of the rail (as opposed to an end surface 108a at the very top or bottom of the ladder) that is closest the wall or vertical surface when in use. The term "side surfaces" refer to the surfaces which look outward to the left and the right of the ladder, assuming a user is standing before the front surface of the ladder to provide a frame of reference. The side surfaces 108b are always generally orthogonal to the longitudinal axes of the rungs 110 of the ladder 106. An end surface 108a is generally the flat surface of the ladder having the smallest surface area. The end surfaces are the surfaces of the ladder which normally contact the ground and/or the vertical wall. In general, the ladder is safer if no projections or other objects protrude from the top of the front of the ladder, where a user might accidently contact or catch a protuberance which might cause him or her to lose their balance and fall. Wheels located on the sides of the rails generally tend to avoid this problem completely. In any case, a wheel should never be located at an end of a rail where it might roll against the ground or a wall when in use, or on the top of the rear of a rail where it may come in contact with the wall against which the ladder is placed. In the case of an "A-frame" ladder, the wheel should not be located in the topmost step above the hinged rails, so that the user is prevented from stepping on a wheel when using the ladder. These geometrical definitions apply whether the ladder is a straight ladder having two parallel rails, or an "A-frame" or collapsible ladder having two rails that are hinged below a top step.

FIG. 21 depicts a man moving a ladder with an internal wheel assembly by lifting one end and pushing the ladder while it rolls on its internal wheel 112. In this Specification and in the Claims that follow, the term "lifting an end" or "lifting one end" of a ladder or any equivalent description refers to a user who grasps, contacts, carries, engages or otherwise affects the position of one portion of a ladder to pick up, levitate, displace, shift, slide or otherwise translate or rotate a ladder without bearing the entire weight of the ladder. The user may lift one end or portion of the ladder directly with his hand, or may employ some other coupling means like a rope, lever, machine or handle. A large portion of the weight of the ladder is borne by a wheel or some other rolling or rotating element which reduces contact friction with the ground or other surface on which the ladder is being transported or moved. This transport surface is usually the ground or some other horizontal plane, but could be an inclined surface like a roof or a hillside, or even another vertical surface like the wall of a building or ship on which the ladder is constrained to move. In one embodiment of the invention, the internal wheel is positioned generally near an end of a rail, since this arrangement offers the best configuration for moving the ladder. When a ladder is moved by lifting one end, the wheel at or near the opposite end becomes a pivot point with the ladder acting as a long lever. The wheel needs to be at or near the opposite end so that the end of the ladder that is farthest away from the user does not scrape or otherwise impinge on the ground when the ladder is lifted and transported.

Figure 22:
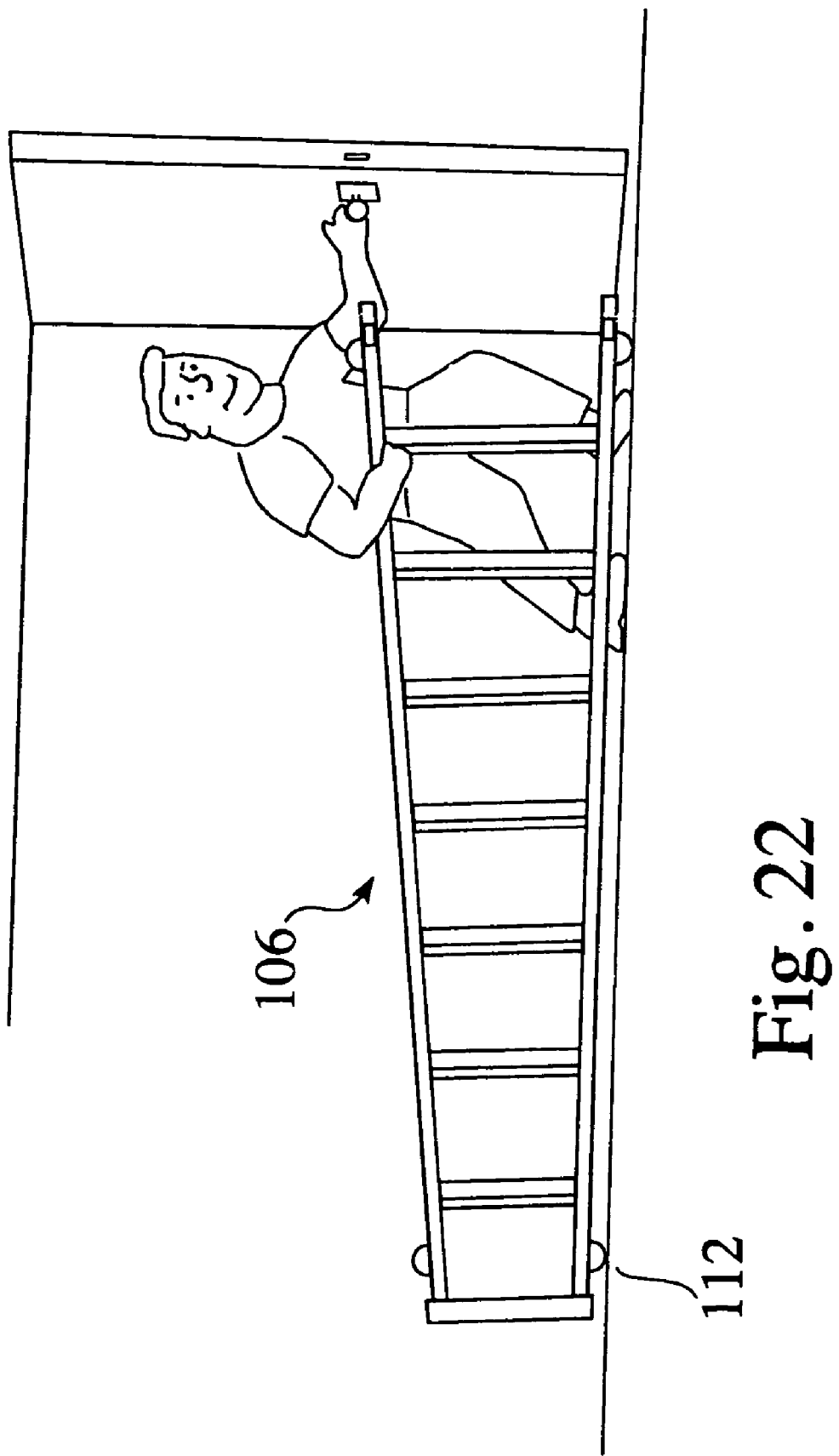
FIG. 22 portrays a man moving a ladder as shown in FIG. 21 through a doorway. The ladder in FIG. 22 is positioned generally perpendicular to the ground.

FIG. 22 portrays a man moving a ladder as shown in FIG. 21 through a doorway. The ladder in FIG. 22 is positioned generally perpendicular to the ground. In some cases, moving a ladder 106 that is positioned perpendicular to the ground, meaning that the rungs 110 extend generally perpendicular to the ground, is far more convenient than moving the ladder while the rungs are generally parallel to the ground. Specifically, the present invention allows one person to move the ladder and wheel combination easily through a doorway, window, opening or some other aperture because the invention provides a wheel which enables the ladder to be moved when the rungs are orthogonal to the transport surface.

Figure 23:
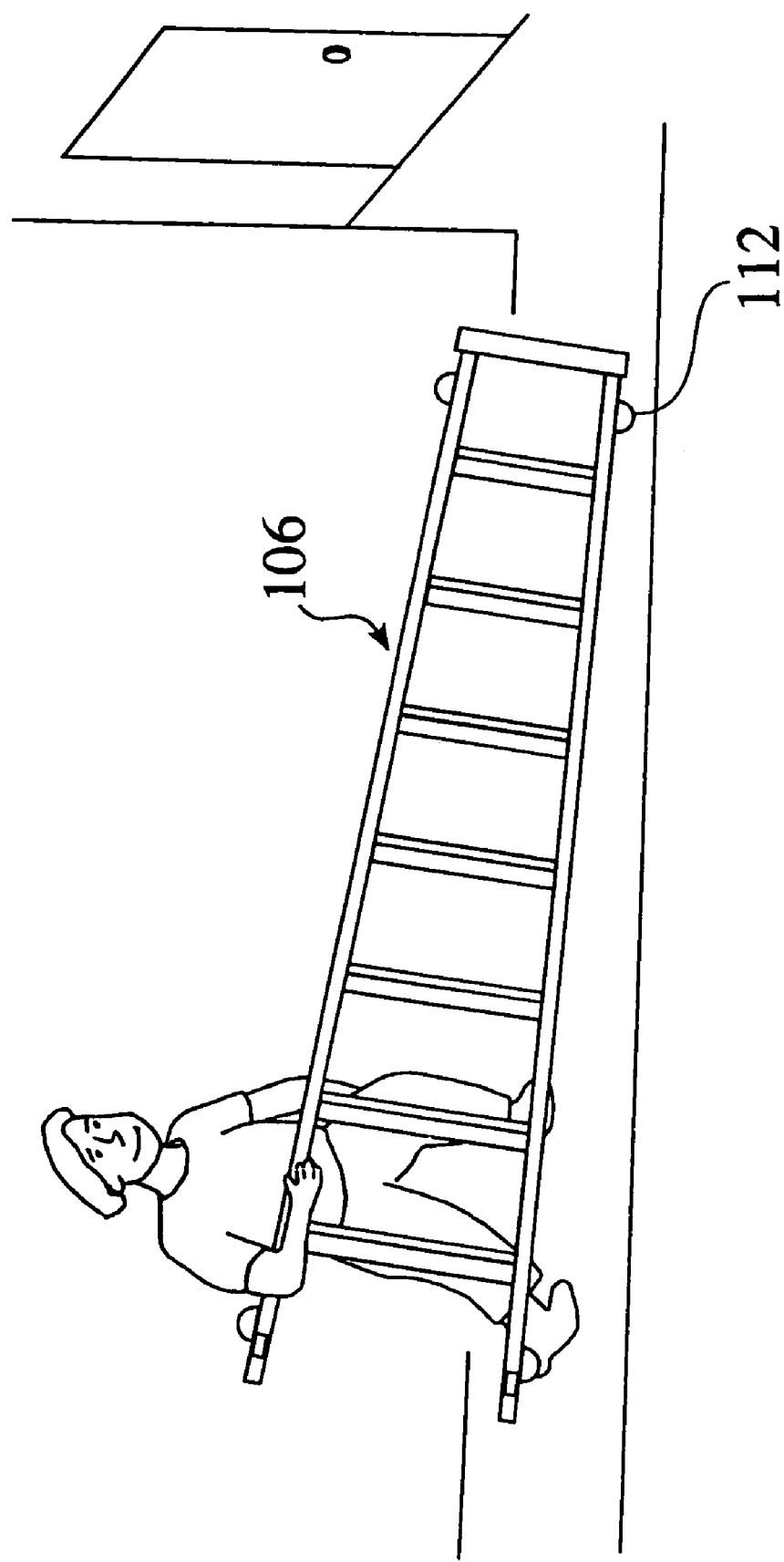
FIG. 23 presents a variation of FIG. 21, in which a man transports an "A-frame" ladder which pivots below a top step.
Figure 24:
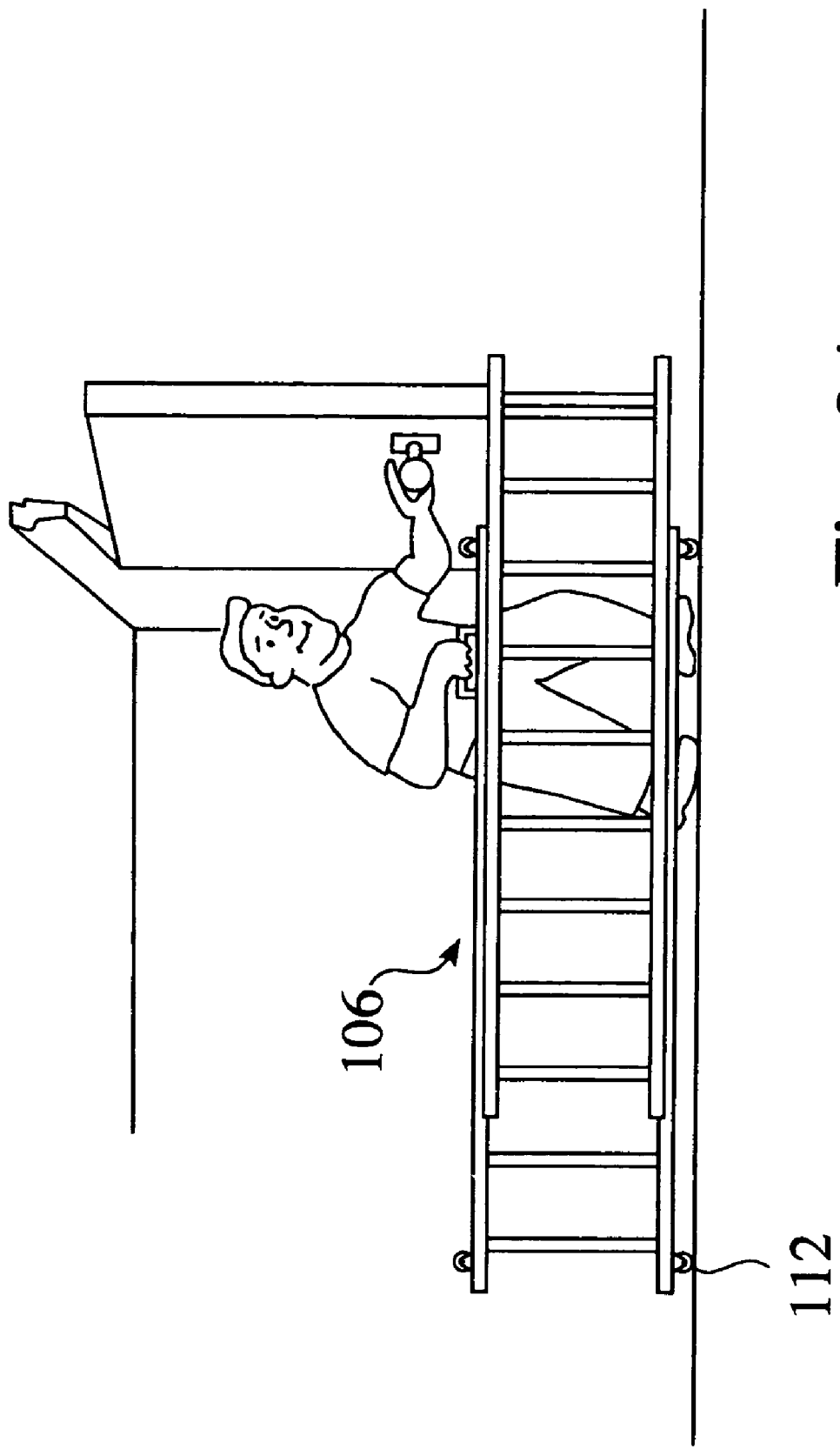
FIG. 24 is another variation of FIG. 21, depicting a man moving a relatively long straight ladder using a convenient handle.
Figure 25:
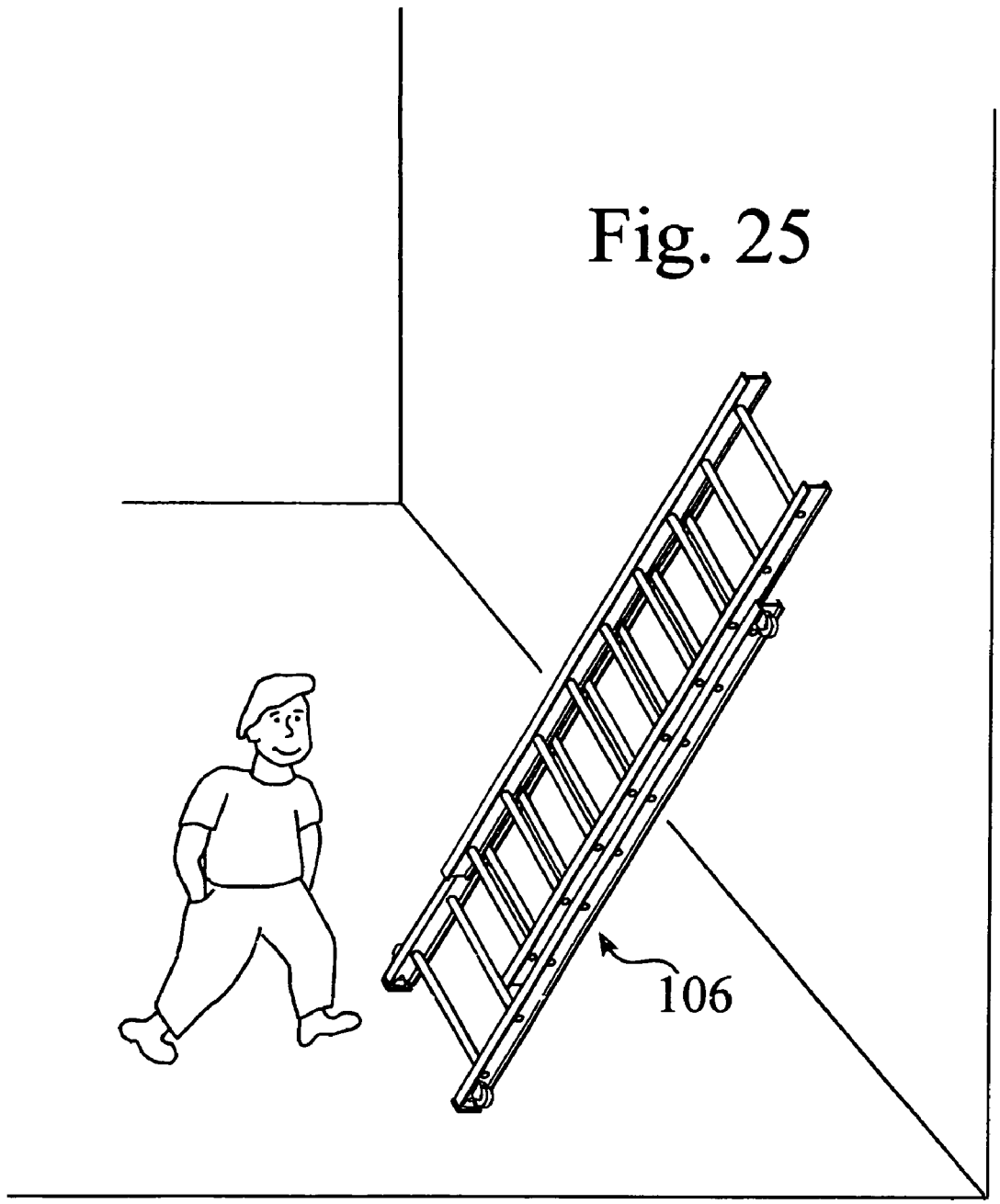
FIG. 25 shows an extension ladder that includes an internal wheel assembly in place against a wall.

FIG. 23 presents a variation of FIG. 21, in which a man transports an "A-frame" ladder which pivots below a top step. FIG. 24 is another variation of FIG. 12, depicting a man moving a relatively long straight ladder using a convenient handle. FIG. 25 shows an extension ladder that includes an internal wheel assembly in place against a wall.

Figure 26:
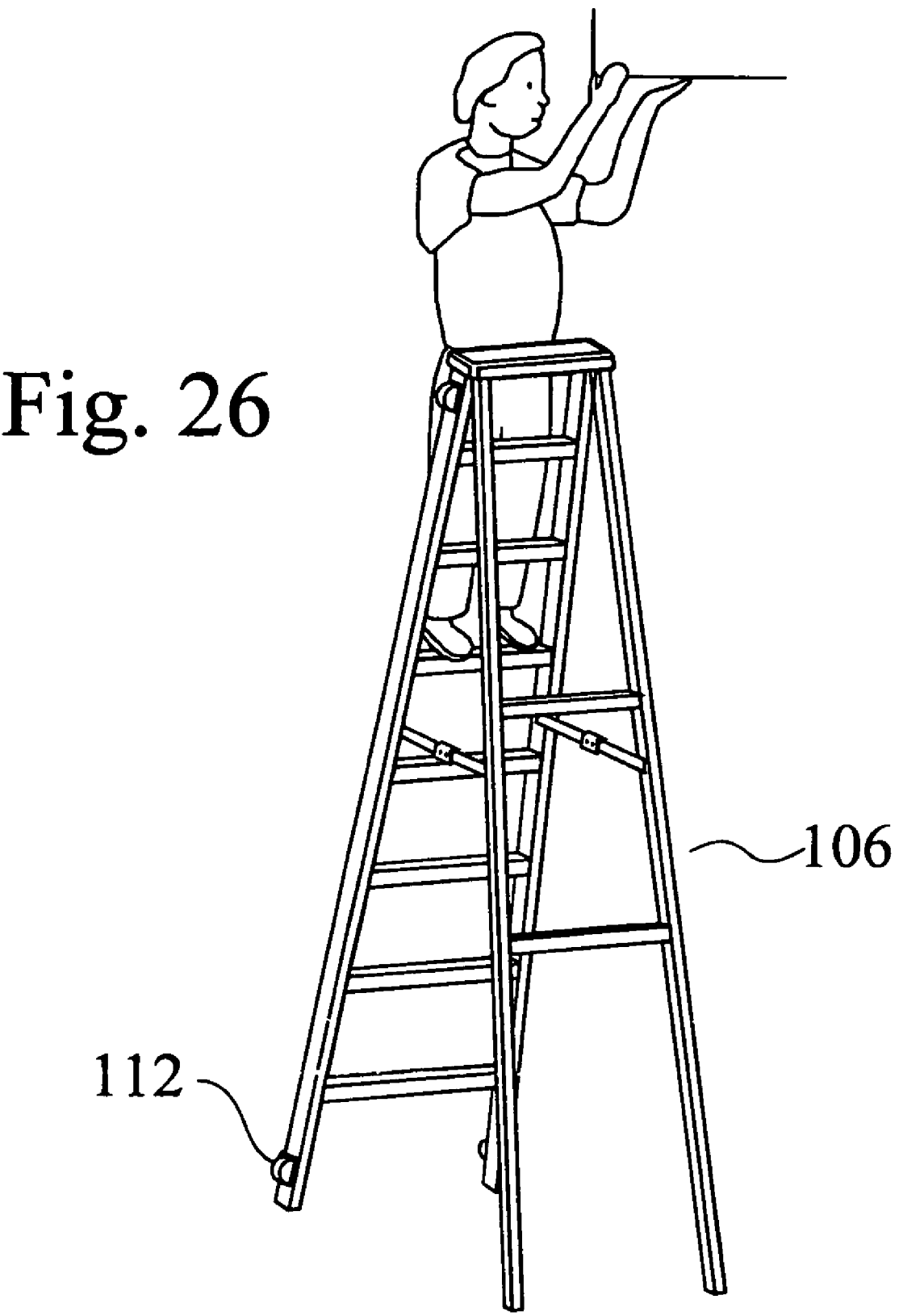
FIG. 26 reveals a man using an A-frame ladder with an internal wheel assembly. This figure demonstrates that this embodiment of the invention allows the user to move the ladder easily by rolling on wheels, as shown in FIG. 27, but these wheels do not interfere with the use of the ladder.
Figure 27:
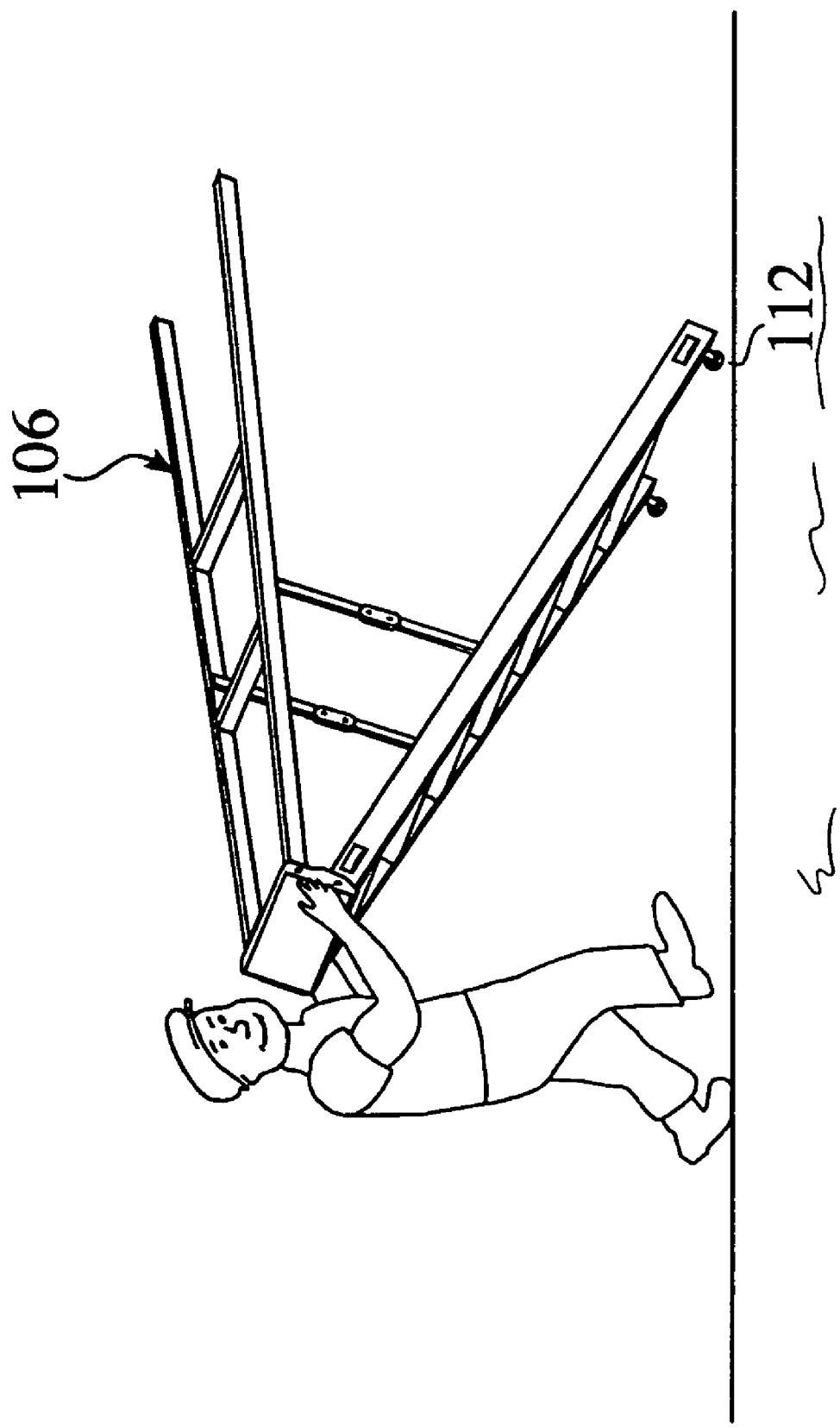

FIG. 26 reveals a man using an A-frame ladder with an internal wheel assembly. This figure demonstrates that this embodiment of the invention allows the user to move the ladder easily by rolling on wheels, as shown in FIG. 27, but these wheels do not interfere with the use of the ladder.

Figure 30:
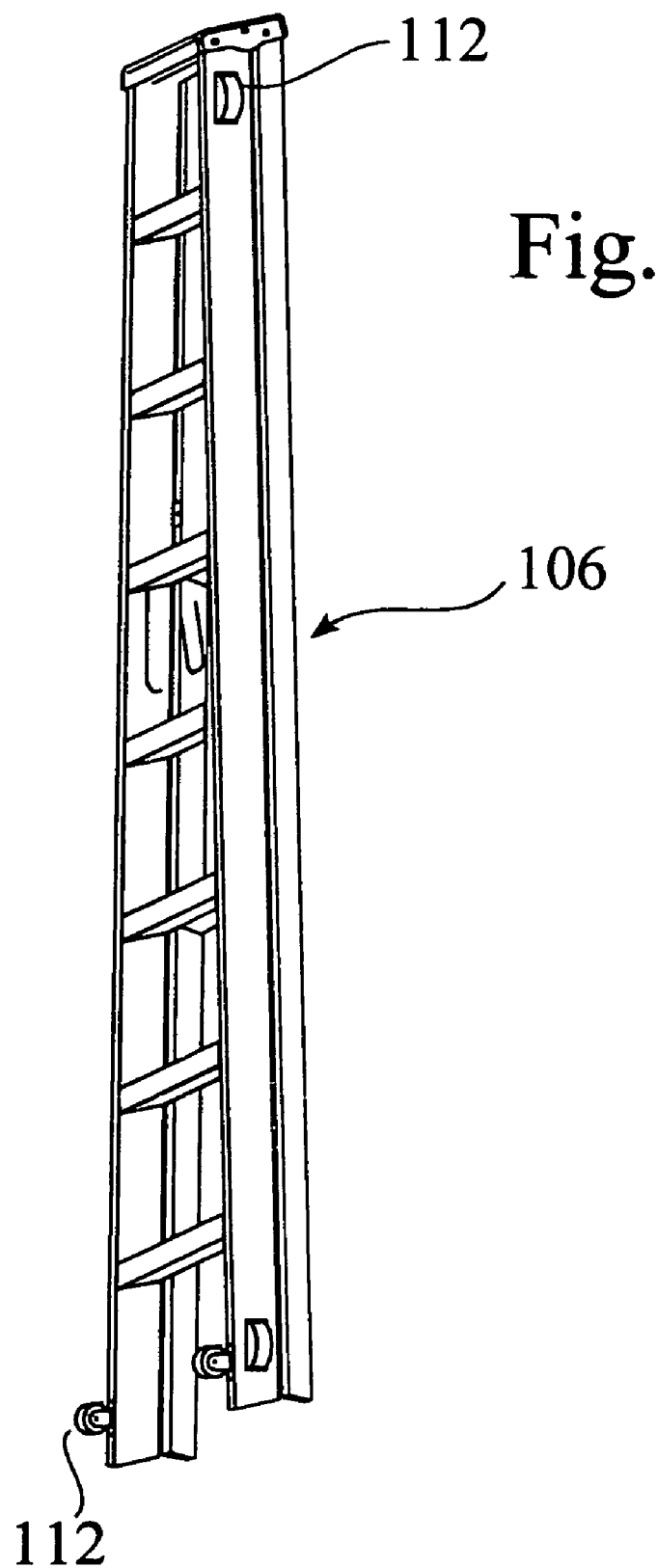
FIG. 30 exhibits a long A-frame ladder.
Figure 31:
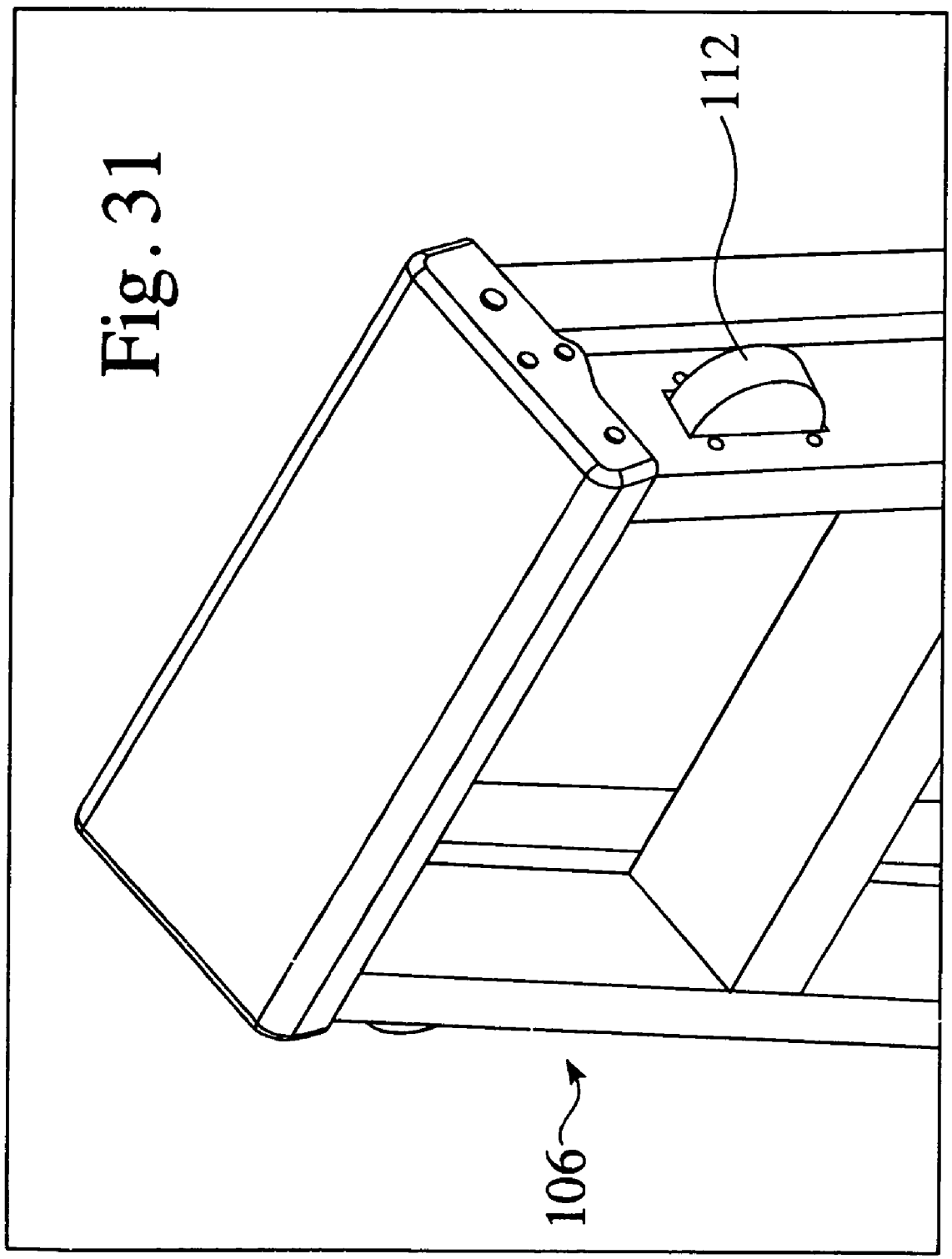
FIGS. 31 & 32 portray details of the A-frame ladder depicted in FIG. 30.
Figure 32:
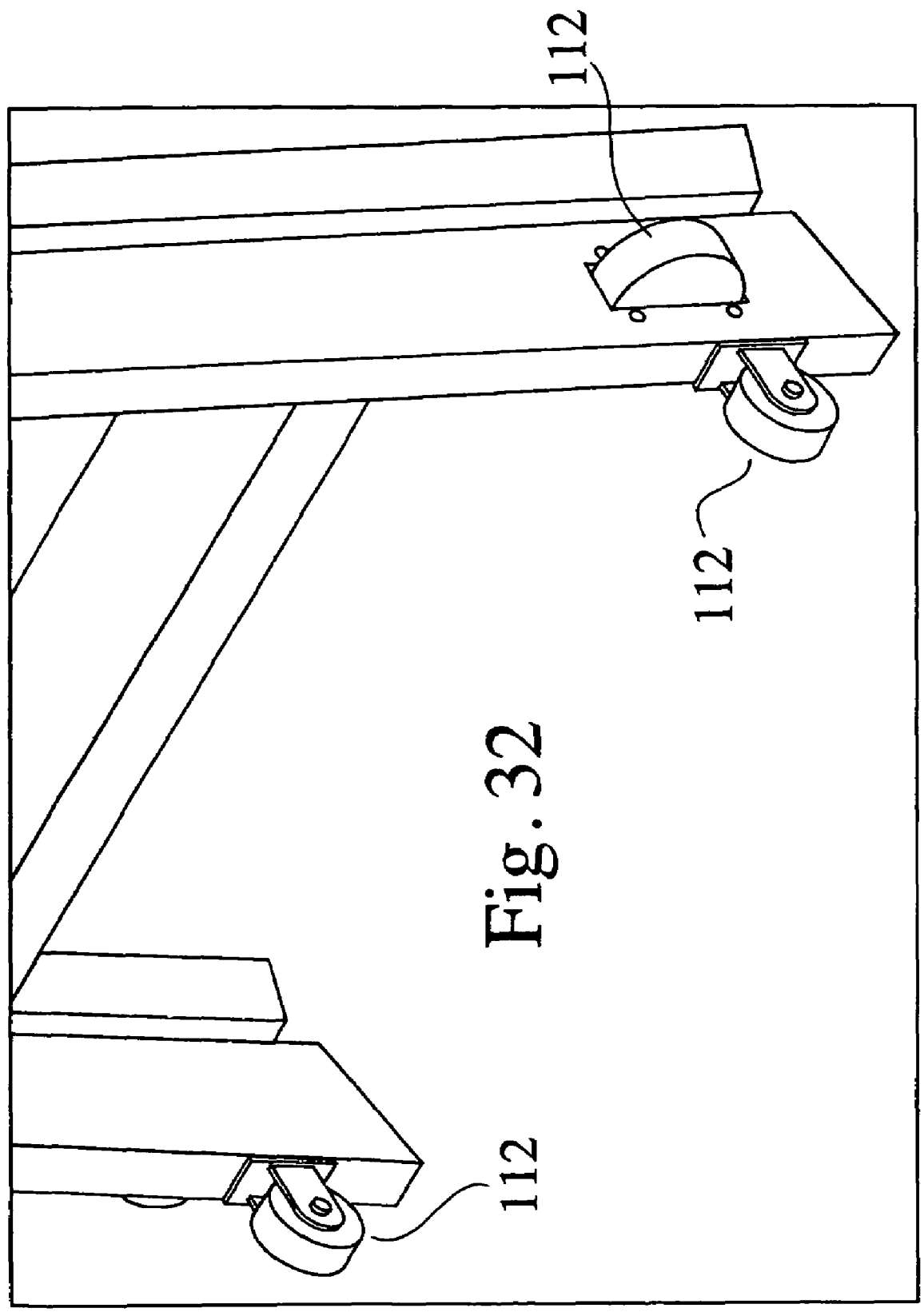
Figure 33:
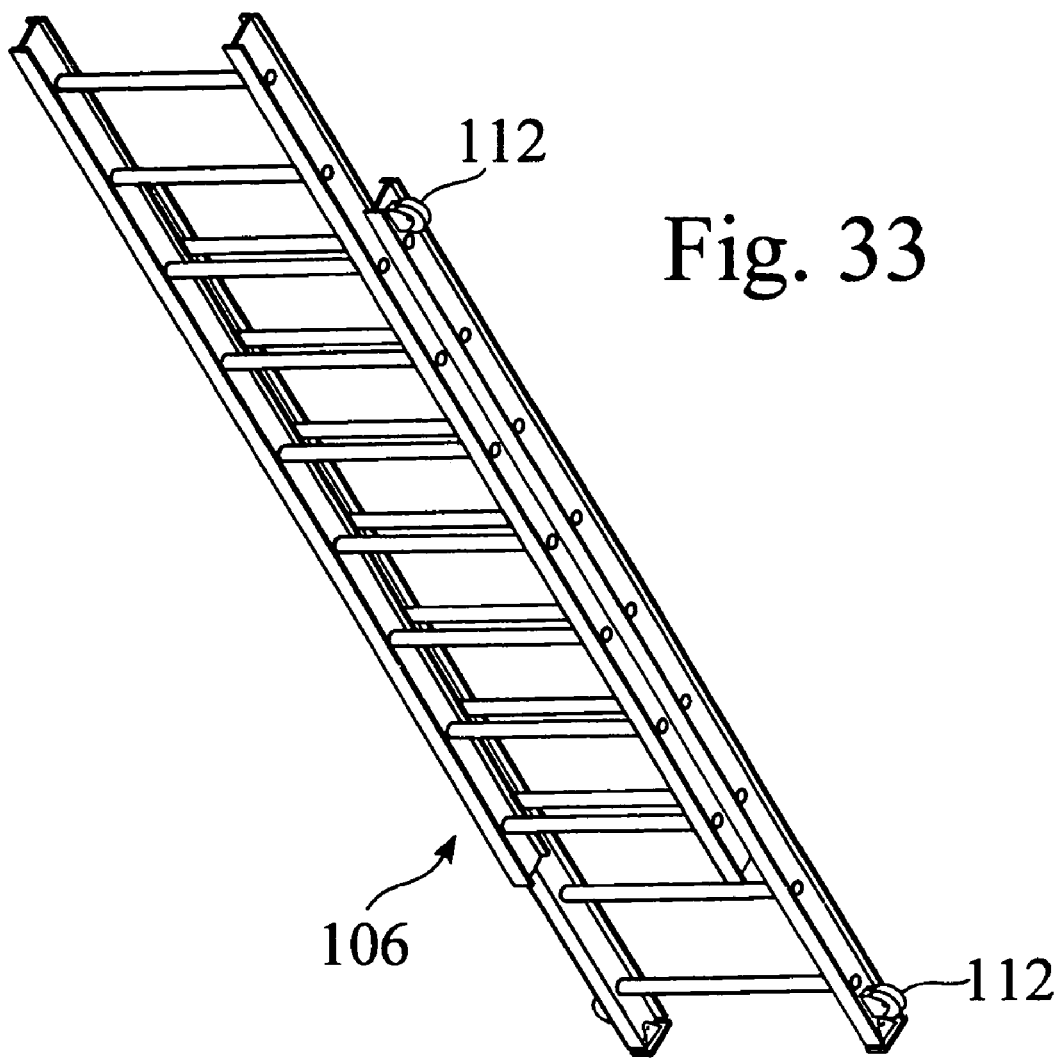
FIG. 33 illustrates an extension ladder.

FIGS. 28 & 29 illustrate additional alternative embodiments of the invention. FIG. 30 exhibits a long A-frame ladder. FIGS. 31 & 32 portray details of the A frame ladder depicted in FIG. 30. FIG. 33 illustrates an extension ladder.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Ladder Transport System that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

FIGS. 1, 2, 3 & 4
10 Method of ladder transport using attachable, dual caster wheel assemblies
10b Alternate method of ladder transport using attachable single or dual caster wheel assemblies
20 Dual caster wheel assembly
22 Ladder assembly
23 Ladder steps
24 First ladder leg
25 Auxiliary stepladder legs
26 User
27 Second ladder leg
28 Support surface, floor or ground
29 Stepladder
30a First caster wheel
30b Second caster wheel
32a First axle
32b Second axle
34a First wheel bracket
34b Second wheel bracket
36 Dual caster clamp frame
38 Clamp screw assembly
40a First pivot pin attachment
40b Second pivot pin attachment
42 Alternative fillet weld attachment
44 Cotter pin
FIG. 5
22 Ladder assembly
23 Ladder step
24 Ladder leg
28 Support surface, floor or ground
42 Alternative fillet weld attachment
44 Cotter pin
46 Inside surface of ladder leg
48 Outside surface of ladder leg
50 Single caster wheel assembly
51 Caster wheel
52 Single caster clamp frame
53 Clamp screw assembly
55 Axle
56 Pivot pin attachment
58 Wheel bracket
FIG. 6
23 Ladder step
24 First ladder leg
27 Second ladder leg
28 Support surface, floor or ground
60 Alternative transport with two single caster wheel assemblies
61 Alternative single caster wheel assembly
62 Alternative single caster frame clamp
64 Wheel bracket
66 Caster wheel
68 Axle
70 Clamp screw
FIG. 7
24 First ladder leg
26 User
27 Second ladder leg
28 Support surface, floor or ground
50 Dual caster wheel assembly
80 Method of ladder transport using attachable single or dual caster wheel assemblies and attachable carrying handle
82 Carrying handle
84 Long ladder assembly with handle FIG. 8
20 Dual-caster wheel assembly
28 Support surface (ground or floor)
30a First caster wheel
30b Second caster wheel
32b Second axle
34a First wheel bracket
34b Second wheel bracket
36 Clamp frame
38 Clamp screw
90 Metal ladder leg (extruded, machined or formed)
FIG. 9
27 Second ladder leg
23 Ladder step
84 Ladder assembly with handle
82 Velcro™ handle
FIG. 10
23 Ladder step
24 Ladder leg
27 Ladder leg
28 Support surface
100 Single caster wheel assembly, non-removably connected
101 Single caster wheel assembly frame
102 Bolts/fasteners 104 Single caster wheel
FIGS. 11 through 29
106 Ladder with Internal Wheel
108 Ladder rail
108a End surface of ladder
108b Side surface of ladder
108c Front surface of ladder
108d Rear surface of ladder
110 Ladder rung
112 Internal Wheel Assembly
E Distance wheel extends beyond plane or surface of rail
L Lifting force
P Person or user
R Arc of rotation as ladder is lifted
W Majority of weight of ladder borne by wheel
X Distance from user's end of ladder to wheel
Y Distance from wheel to end opposite user

What is claimed is:

1. A ladder comprises:
a pair of rails, each of the pair of rails including an end surface; and
a plurality of wheels adjustably clamped to the rails; the plurality of wheels for allowing a user to transport the ladder by lifting only a portion of weight of the ladder, the plurality of wheels are in contact with a ground surface when the end surface of the rails is above the ground surface when the ladder is transported and the plurality of wheels are above the ground surface when the end surface of the rails are in contact with the ground surface when the ladder is in use, wherein the plurality of wheels comprises two wheels coupled to each of the rails, the two wheels being orthogonal to each other.

2. The ladder of claim 1 wherein the plurality of wheels are removably attached to the pair of rails.

3. The ladder of claim 1 wherein the plurality of wheels are external to the plurality of rails.

4. The ladder of claim 1 wherein the ladder is foldable.

* * * * *